United States Patent [19]

Nguyen et al.

[11] Patent Number: 5,321,559
[45] Date of Patent: Jun. 14, 1994

[54] ASYNCHRONOUS PEAK DETECTION OF INFORMATION EMBEDDED WITHIN PRML CLASS IV SAMPLING DATA DETECTION CHANNEL

[75] Inventors: Hung C. Nguyen, San Jose; William L. Abbott, Portola Valley, both of Calif.

[73] Assignee: Quantum Corporation, Milpitas, Calif.

[21] Appl. No.: 937,352

[22] Filed: Aug. 27, 1992

[51] Int. Cl.⁵ ..................... G11B 5/09; G11B 5/035
[52] U.S. Cl. ............................. 360/46; 360/51; 360/65
[58] Field of Search ............ 360/46, 51, 53, 65, 360/77.08; 375/14, 18, 101

[56] References Cited

U.S. PATENT DOCUMENTS

| | | | |
|---|---|---|---|
| 4,504,872 | 3/1985 | Peterson | 360/40 |
| 4,644,564 | 2/1987 | Dolivo et al. | 375/18 |
| 4,750,058 | 6/1988 | Hirt et al. | 360/67 |
| 4,847,871 | 7/1989 | Matsushita et al. | 375/94 |
| 5,060,088 | 10/1991 | Dolivo et al. | 360/65 |
| 5,255,131 | 10/1993 | Coker et al. | 360/48 |

OTHER PUBLICATIONS

Wood, Peterson, "Viterb. Detection of Class IV Partial Response on a Magnetic Recording Channel," IEEE Trans. on Communications, vol. Com 34 No. 5 May 1986, pp. 454–461.

Schmerbeck, Richetta, Smith, "A 27 MH₂ Mixed Analog/Digital Magnetic Recording Channel DSP Using Partial Response Signalling with Maximum Likelihood Detection" Proc 1991 IEEE Int'l Solid State Circuits Conf. pp. 136–137, 304, and pp. 96, 97, 256 Slide Supplement.

Wood, Ahigrim, Houarnasek, Swenson, "An Experimental Eight-inch Disc Drive with 100 M Bytes per (List continued on next page.)

Primary Examiner—Donald Hajec
Assistant Examiner—Won Tae C. Kim
Attorney, Agent, or Firm—David B. Harrison

[57] ABSTRACT

A digital peak detection circuit asynchronously detects embedded overhead information such as servo or sync pattern data within a PR4,ML synchronous data detection channel of a magnetic disk drive. The channel includes an analog to digital converter clocked by a data clock operating asynchronously with respect to playback of the embedded overhead information in the channel for converting an analog data stream into raw data samples, and an adaptive digital FIR filter for conditioning the raw data samples into conditioned data samples in accordance with programmable filter coefficients. The digital peak detection circuit includes a filter adaptation circuit for programming the digital FIR filter to a bandwidth characteristic selected for the embedded overhead information, a plurality of tapped clock delays each connected in tandem to receive and progressively by a period related to said data clock to delay conditioned data samples of the embedded overhead information, a first comparison logic array connected to predetermined taps of said tapped data clock period delays for comparing said conditioned data samples of the embedded overhead information at said taps (List continued on next page.)

and for generating a first logical condition therefrom, a second comparison logic array connected to a predetermined tap of said tapped clock delay means and to a threshold-providing circuit, for comparing the conditioned data samples of the embedded overhead information at the taps with threshold values provided by the threshold-providing circuit and for generating a second logical condition therefrom, and a digital combining circuit for combining the first logical condition and the second logical condition in order to detect and put out the embedded overhead information. A fault tolerant sync pattern detection method and apparatus is also disclosed.

17 Claims, 15 Drawing Sheets

OTHER PUBLICATIONS

Surface" *IEEE Trans. on Magnetics* vol. Mag. 20, No. 5, Sep. 1984 pp. 698–702.

Kobayashi, Tang, "Application of Partial-Response Channel Coding to Magnetic Recording Systems," *IBM Journal of Research and Develop.*, Jul., 1970 pp. 368–375.

Kobayshi, "Application of Probabilistic Decoding to Digital Magnetic Recording Systems" *IBM Journal of Research and Develop.* Jan. 1971, pp. 64–74.

Dolivo, "Signal Processing of High-Density Digital Magnetic Recording" *Proc. 1989 IEEE VLSI and Computer Peripherals*, Hamburg West Germany, May 1989 pp. 1-91 to 1-96.

Coker, Galbraith, Kerwin, Rae, Lipepovich, "Implementation of PRML in a Rigid Disk Drive" *IEEE Trans. on Magnetics*, vol. 27, No. 6, Nov. 1991.

Cideciyan, Dolivo, Hermann, Hirt, Schott, "A PRML System for Digital Magnetic Recording" *IEEE Journal on Selected Areas of Communication*, vol. 10, No. 1, Jan. 1992, pp. 38–56.

Data Sheet DP8468, *Mass Storage Handbook* National Semiconductor Corp. 1989 Ed. pp. 1-27 to 1-48.

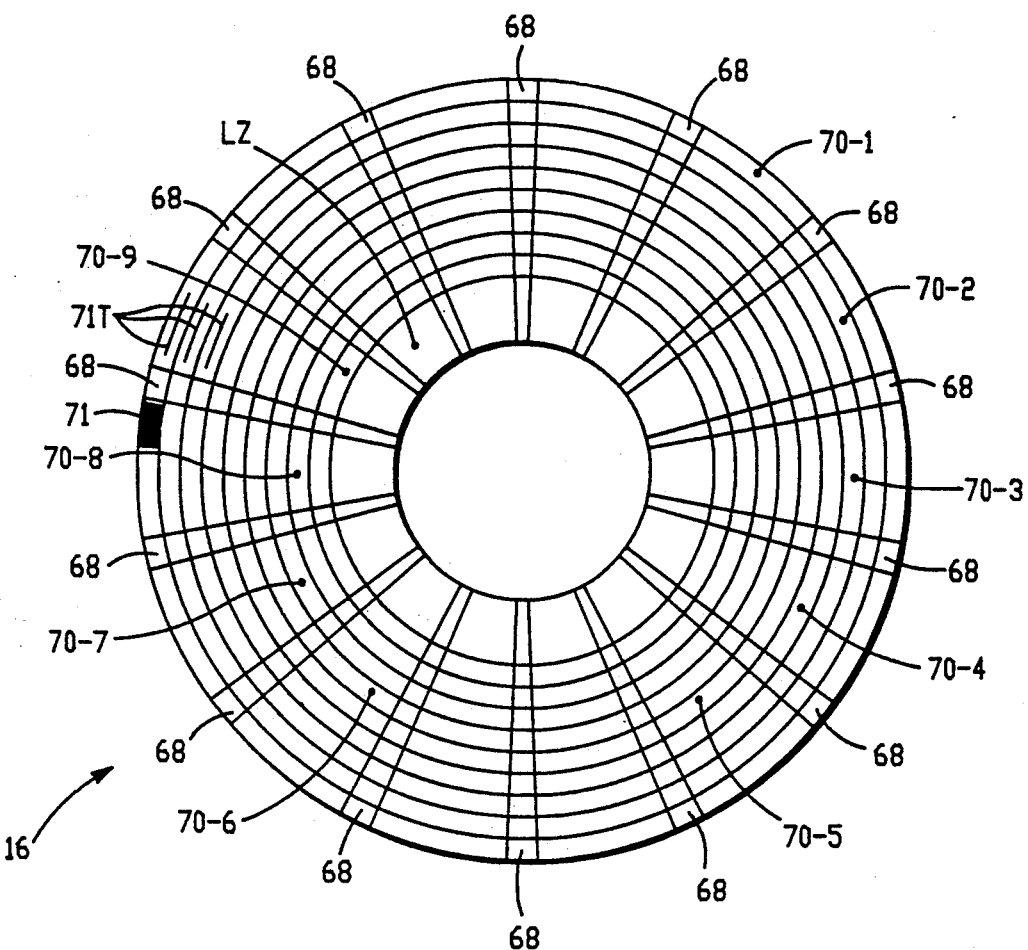
FIG.-5
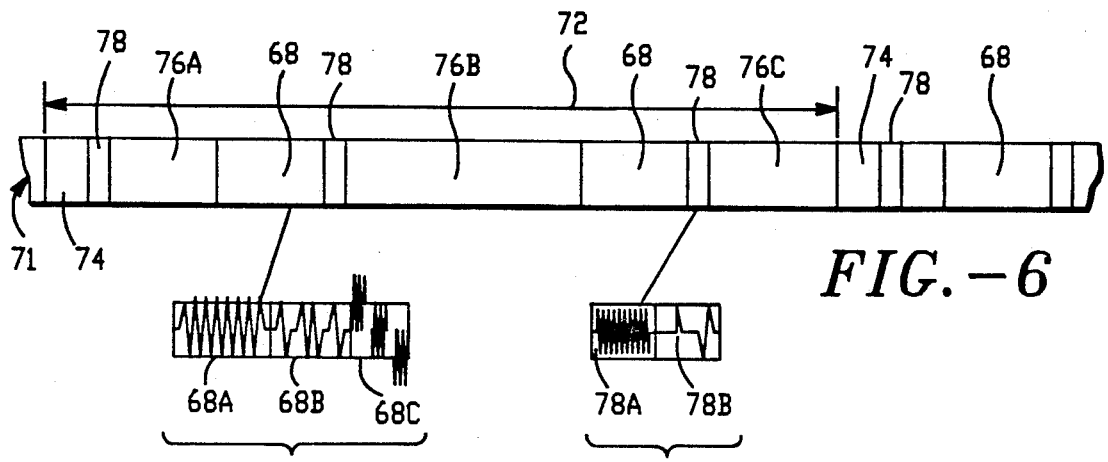
FIG.-6
FIG.-6A  FIG.-6B

FIG.-18

| | A | A' | | | | | B | | | B' | | | C | | | C' | Description |
|---|---|---|---|---|---|---|---|---|---|---|---|---|---|---|---|---|---|
| | 516 | 515 | 514 | 513 | 512 | 511 | 510 | 59 | 58 | 57 | 56 | 55 | 54 | 53 | 52 | 51 | |
| 1) | 1 | 0 | 0 | 0 | 0 | 0 | 0 | 1 | 1 | 1 | 0 | 0 | 0 | 0 | 0 | 1 | (NO ERROR) |
| 2) | 1 | 0 | 0 | 0 | 0 | 0 | 0 | 0 | 1 | 1 | 0 | 0 | 0 | 0 | 0 | 1 | (BB' SHIFTS RIGHT) |
| 3) | 1 | 0 | 0 | 0 | 0 | 0 | 1 | 1 | 0 | 1 | 0 | 0 | 0 | 0 | 0 | 1 | (BB' SHIFTS LEFT) |
| 4) | 1 | 1 | 0 | 0 | 0 | 0 | 0 | 1 | 1 | 1 | 0 | 0 | 0 | 0 | 0 | 1 | (AA' SHIFTS RIGHT) |
| 5) | 1 | 0 | 0 | 0 | 0 | 0 | 0 | 1 | 1 | 1 | 0 | 0 | 0 | 1 | 1 | 1 | (CC' SHIFTS LEFT) |
| 6) | 1 | 1 | 0 | 0 | 0 | 0 | 0 | 1 | 1 | 1 | 0 | 0 | 0 | 1 | 1 | 1 | (AA' SHIFTS RIGHT & CC' SHIFTS LEFT) |
| 7) | 1 | 0 | 0 | 0 | 0 | 0 | 0 | 1 | 0 | 1 | 0 | 0 | 0 | 0 | 0 | 1 | (B' IS MISSING) |
| 8) | 1 | 0 | 0 | 0 | 0 | 0 | 0 | 0 | 1 | 0 | 0 | 0 | 0 | 0 | 0 | 1 | (B IS MISSING) |
| 9) | 0 | 0 | 0 | 0 | 0 | 0 | 0 | 1 | 1 | 1 | 0 | 0 | 0 | 0 | 0 | 1 | (A' IS MISSING) |
| 10) | 1 | 1 | 0 | 0 | 0 | 0 | 0 | 1 | 1 | 1 | 0 | 0 | 0 | 0 | 1 | 0 | (C IS MISSING) |
| 11) | 0 | 0 | 0 | 0 | 0 | 0 | 0 | 0 | 1 | 1 | 0 | 0 | 0 | 0 | 0 | 1 | (A' AND B ARE MISSING) |
| 12) | 0 | 0 | 0 | 0 | 0 | 0 | 0 | 1 | 1 | 0 | 0 | 0 | 0 | 0 | 0 | 0 | (A' AND C ARE MISSING) |
| 13) | 1 | 0 | 0 | 0 | 0 | 0 | 0 | 1 | 0 | 0 | 0 | 0 | 0 | 0 | 0 | 0 | (B' AND C ARE MISSING) |

ASYNCHRONOUS PEAK DETECTION OF INFORMATION EMBEDDED WITHIN PRML CLASS IV SAMPLING DATA DETECTION CHANNEL

REFERENCE TO RELATED APPLICATION

The present invention is related to U.S. patent application Ser. No. 07/937,064, filed on Aug. 27, 1992 and entitled DISK DRIVE USING PRML CLASS IV SAMPLING DATA DETECTION WITH DIGITAL ADAPTIVE EQUALIZATION, the disclosure of which is hereby incorporated herein by reference.

FIELD OF THE INVENTION

The present invention relates to methods and apparatus for asynchronous peak detection of information embedded within a partial response, class IV, maximum likelihood (hereinafter referred to as "PR4,ML") synchronous detection data channel. More particularly, the present invention relates to asynchronous peak detection of embedded servo and sync field information within a data stream of a PR4,ML data channel of a high performance magnetic disk data storage subsystem.

BACKGROUND OF THE INVENTION

Conventional disk drives have employed peak detection techniques in order to recover digital data written as saturation recording onto a magnetizable surface media of a rotating disk. With peak detection techniques, it is necessary to space flux transitions sufficiently apart so that analog peaks in the recovered data stream may be identified and the corresponding data recovered. In order to achieve reasonable bandwidths in data channels, it has been customary to employ data coding techniques. One such technique has been to use a (1,7) RLL code. In this code, flux transitions can be no closer together than every other clock bit time period ("bit cell") nor farther apart than eight clock bit cells. (1,7) RLL codes are known as "rate two-thirds" codes, in the sense that two data bits are coded into three code bits. Thus, with a rate two-thirds code, one third of the user storage area of the storage disk is required for code overhead.

One way to decrease the code overhead is to employ a code in which flux transitions are permitted in adjacent bit cells. One such code is a (0,4,4) code. The (0,4,4) code can be implemented as a rate eight-ninths code, meaning that nine code bits are required for eight incoming data bits. (Theoretically, the (0,4,4) code ratio is somewhat higher, approaching 0.961.) Thus, this code is significantly more efficient than a rate two-thirds code, such as (1,7) RLL. Use of a (0,4,4) code results in a significantly greater net user data storage capacity on the disk surface, given a constant bit cell rate. However, when flux transitions occur in adjacent bit cells, as is the case with a (0,4,4) code, intersymbol interference ("ISI") results. Conventional peak detection techniques are not effective or reliable in recovering data coded in an eight-ninths code format, such as (0,4,4).

The zero in the (0,4,4) code denotes that flux transitions may occur in directly adjacent bit cells of the coded serial data stream. The first "4" denotes that a span of no more than four zeros occurs between ones in the encoder output. The second "4" signifies that the bit cell stream has been divided into two interleaves: an even interleave, and an odd interleave; and, it denotes that there can be a span of no more than four zeros between ones in the encoder output of either the odd interleave or the even interleave.

It is known that partial response signalling enables improved handling of ISI and allows more efficient use of the bandwidth of a given channel. Since the nature of ISI is known in these systems, it may be taken into account in the decoding/detection process. Partial response transmission of data lends itself to synchronous sampling and provides an elegant compromise between error probability and the available spectrum. The partial response systems described by the polynomials $1+D$, $1-D$, and $1-D^2$ are known as duobinary, dicode and class IV (or "PR4"), respectively, where D represents one bit cell delay and $D^2$ represents 2 bit cell delays (and further where $D = e^{-j\omega T}$, where $\omega$ is a frequency variable in radians per second and T is the sampling time interval in seconds). The PR4 magnitude response plotted in FIG. 1 hereof and given the notation $|1-D^2|$ emphasizes midband frequencies and results in a read channel with increased immunity to noise and distortion at both low and high frequencies. In magnetic recording PR4 is a presently preferred partial response system, since there is a close correlation between the idealized PR4 spectrum as graphed in FIG. 1, and the natural characteristics of a magnetic data write/read channel.

In order to detect user data from a stream of coded data, not only must the channel be shaped to a desired partial response characteristic, such as the PR4 characteristic, but also a maximum likelihood ("ML") sequence estimation technique is needed. The maximum likelihood sequence estimation technique determines the data based upon an analysis of a number of consecutive data samples taken from the coded serial data stream, and not just one peak point as was the case with the prior peak detection methods.

One maximum likelihood sequence estimation algorithm is known as the Viterbi detection algorithm, and it is well described in the technical literature. Application of the Viterbi algorithm to PR4 data streams within a magnetic recording channel is known to improve detection of original symbol sequences in the presence of ISI and also to improve signal to noise ratio over comparable peak detection techniques.

In an article entitled "Viterbi Detection of Class IV Partial Response on a Magnetic Recording Channel" appearing in *IEEE Trans. on Communications*, vol. Com-34, No. 5, May 1986, pp. 434–461, authors Wood and Peterson explain the derivation of PR4 as being formed by subtracting waveforms two bit intervals apart, thereby forming an analog domain ternary "eye" pattern graphed herein in FIG. 2.

The Viterbi algorithm provides an iterative method of determining the "best" route along the branches of a trellis diagram, such as the one shown in FIG. 3 hereof, for example. If, for each trellis branch, a metric is calculated which corresponds to the logarithm of the probability for that branch, then the Viterbi algorithm may be employed to determine the path along the trellis which accumulates the highest log probability, i.e., the "maximum likelihood" sequence. Since the Viterbi algorithm operates upon a sequence of discrete samples $\{y_k\}$, the read signal is necessarily filtered, sampled, and equalized.

While PRML has been employed in communications signalling for many years, it has only recently been applied commercially within magnetic hard disk drives. One recent application is described in a paper by Schmerbeck, Richetta, and Smith, entitled "A 27 MHz Mixed Analog/Digital Magnetic Recording Channel DSP Using Partial Response Signalling with Maximum Likelihood Detection", *Proc.* 1991 *IEEE International Solid State Circuits Conference*, pp. 136–137, 304, and pp. 96, 97 and 265 Slide Supplement. While the design reported by Schmerbeck et al. appears to have worked satisfactorily, it has drawbacks and limitations which are overcome by the present invention. One drawback of the reported approach was its design for transducers of the ferrite MiG type or of the magnetoresistive type which simplified channel equalization requirements. Another drawback was the use of a single data transfer rate which significantly simplified channel architecture. A further drawback was the use of a dedicated servo surface for head positioning within the disk drive, thereby freeing the PR4, ML data channel from any need for handling of embedded servo information or for rapid resynchronization to the coded data stream following each embedded servo sector.

Prior Viterbi detector architectures and approaches applicable to processing of data sample sequences taken from a communications channel or form a recording device are also described in the Dolivo et al. U.S. Pat. No. 4,644,564. U.S. Pat. No. 4,504,872 to Peterson describes a digital maximum likelihood detector for class IV partial response signalling. An article by Roger W. Wood and David A. Peterson, entitled: "Viterbi Detection of Class IV Partial Response on a Magnetic Recording Channel" *IEEE Trans. on Comm.* Vol. Com-34, No. 5, May 1986, pp. 454–466 describes application of Viterbi detection techniques to a class IV partial response in a magnetic recording channel. An article by Roger Wood, Steve Ahigrim, Kurt Hallarnasek and Roger Stenerson entitled: "An Experimental Eight-Inch Disc Drive with One-Hundred Megabytes per Surface", *IEEE Trans. on Magnetics*, Vol. Mag-20, No. 5, September 1984, pp 698–702 describes application of class IV partial response encoding and Viterbi detection techniques as applied within an experimental disk drive. A digital Viterbi detector capable of withstanding lower signal to noise ratios is described in Matsushita et al. U.S. Pat. No. 4,847,871. These documents are representative examples of the known state of the prior art.

When zoned data recording techniques, embedded servo sectors, and e.g. thin-film heads are employed in a high performance, very high capacity, low servo overhead disk drive, the prior approaches are not adequate, and a hitherto unsolved need has arisen for an approach incorporating PR4,ML techniques into a high capacity, high performance, low cost disk drive architecture including architectural features such as e.g. thin-film heads, embedded sector servo based head positioning, and zone-data-recording techniques.

In particular, a hitherto unsolved need has arisen for an efficient, effective way to detect the embedded sector servo identification information which is asynchronous with the coded user data. Ordinarily, in a conventional peak detection channel, the embedded servo sector identification field is detected by the analog peak detector. In a sampling detection system, such as PR4,ML, an analog peak detector is not present, because the data samples are processed digitally.

In addition, before the data samples are valid, it is necessary to establish the beginning of a data field. Typically, the beginning of a data field, or field segment within a split data field pattern, is marked with a sync pattern. Since in a detector that uses a digital adaptive equalizer such as a FIR filter, the equalizer may not be optimized (e.g. before training or adaptation thereof is complete) when reading the sync pattern, robust detection of the sync pattern without using the equalizer is required.

In disk drives using embedded servo sectors, the effective bandwidth of the data fields is much greater than the effective bandwidth of the embedded servo fields. Therefore, if the same analog low pass filter is used alone for both the data fields and the embedded servo fields, very noisy signals may result while reading the servo field, particularly if the analog low pass filter is adapted to the PR4,ML spectrum, FIG. 1, and zoned data recording techniques are used. Thus, a hitherto unsolved need has remained for effective asynchronous detection of embedded information, such as servo position information, within a PR4,ML synchronous detection data channel.

SUMMARY OF THE INVENTION

A general object of the present invention is to provide an improved, efficient method and enabling apparatus for detecting asynchronously servo and sync information within a data stream of disk drive read channel employing PRML techniques, embedded servo sectors, and zoned data recording techniques in a manner overcoming limitations and drawbacks of the prior art.

One more object of the present invention is to provide an improved, efficient method and enabling apparatus for detecting asynchronously servo and sync information which makes effective use of an adaptive equalizer including a digital finite impulse response ("FIR") filter of a PR4, ML disk drive data channel and which is programmable "on-the-fly" for asynchronous detection of the servo and sync information embedded within, and periodically interrupting the coded data stream.

Yet one more object of the present invention is to provide a filter coefficient adaptation circuit for programming an FIR filter within a PR4, ML disk drive data channel which lends itself to programmability for asynchronous detection of embedded servo and sync information as well as for continuous adaptation to various data channel characteristics to facilitate synchronous, maximum likelihood detection of coded user data samples.

A related object of the present invention is to provide a digital FIR filter and a digital filter coefficient adaptation circuit for adapting the digital FIR filter to a desired particular response of a PR4,ML disk drive data channel, including the ability to load a preprogrammed filter setting, or settings, for detecting embedded servo and sync information.

Another object of the present invention is to provide a method for using a PR4, ML data channel in an asynchronous mode in order to recover head position servo information within servo sectors embedded within concentric data tracks of a disk drive wherein the servo information is recorded at a different frequency and phase than the coded user data elsewhere recorded in the data track.

Another object of the present invention is to provide a digital peak detector for asynchronous detection of servo information and/or sync pattern information embedded in a data track of a disk drive employing a PR4, ML data channel.

One more object of the present invention is to provide a data ID field sync pattern detection method with improved fault tolerance within a PR4,ML disk drive data channel.

In accordance with principles of the present invention, a digital peak detection circuit asynchronously detects embedded overhead information within a PR4,ML synchronous data detection channel of a magnetic disk drive. The channel includes an analog to digital converter clocked by a data clock operating asynchronously with respect to playback of the embedded overhead information in the channel for converting an analog data stream into raw data samples, and an adaptive digital FIR filter for conditioning the raw data samples into conditioned data samples in accordance with programmable filter coefficients. The digital peak detection circuit includes:

a filter adaptation circuit for programming the digital FIR filter to a bandwidth characteristic selected for the embedded overhead information, a plurality of tapped clock delays each connected in tandem to receive and progressively by a period related to said data clock to delay conditioned data samples of the embedded overhead information, a first comparison logic array connected to predetermined taps of said tapped data clock period delays for comparing said conditioned data samples of the embedded overhead information at said taps and for generating a first logical condition therefrom, a second comparison logic array connected to a predetermined tap of said tapped clock delay means and to a threshold-providing circuit for comparing the conditioned data samples of the embedded overhead information at the taps with threshold values provided by the threshold-providing circuit and for generating a second logical condition therefrom, and a digital combining circuit for combining the first logical condition and the second logical condition in order to detect and put out the embedded overhead information.

In one aspect of the invention, the data detection channel further comprises a programmable analog filter-equalizer upstream of the analog to digital converter, and programming circuitry for programming the analog filter-equalizer to a bandwidth characteristic selected for the embedded overhead information.

In another aspect of the invention, the plurality of tapped clock delays comprises three single clock period delay circuits connected in tandem, the predetermined taps provide $y_k$, $y_{k-1}$ and $y_{k-2}$ data samples, and the embedded overhead information comprises embedded servo information.

In a further aspect of the invention, the plurality of tapped clock delays comprises five single clock period delay circuits connected in tandem, the predetermined taps provide $y_k$, $y_{k-2}$ and $y_{k-4}$ data samples, and the embedded overhead information comprises user data field sync pattern information in the form of a single magnetic flux transition signal located generally in the middle of a predetermined interval of non-transition in the write-current input waveform.

In yet another aspect of the invention, the first comparison logic array determines the first logical condition as a flux transition (logic one value) being present if one of the following is true: $y_{k-1} \geq y_k$ and $y_{k-1} > y_{k-2}$, or $y_{k-1} \leq y_k$ and $y_{k-1} < y_{k-2}$; and otherwise no flux transition (a logical zero value) being present.

In one more aspect of the invention the second comparison logic array is connected to a tap providing a $y_{k-1}$ data sample and determines the second logical condition as a flux transition (logical one value) being present if an absolute value of the $y_{k-1}$ data sample is greater than or equal to the threshold value, and otherwise no flux transition (a logical zero value) being present.

In still one more aspect of the invention the first comparison logic array determines the first logical condition as a flux transition (logical one value) being present if $y_{k-1} \geq y_k$ and $y_{k-1} > y_{k-2}$, and otherwise no flux transition (a logical zero value) being present; the second comparison logic array is connected to a tap providing a $y_{k-1}$ data sample and determines the second logical condition as a flux transition (logical one value) being present if an absolute value of the $y_{k-1}$ data sample is greater than or equal to a the threshold value, and otherwise no flux transition (a logical zero value) being present; and, the digital combining circuit comprises an AND gate for ANDing the first logical condition and the second logical condition.

As one more aspect of the invention, a data field sync pattern detection circuit is connected to receive and detect the user data field sync pattern information and the first comparison logic circuit determines the first logical condition as a flux transition (logical one value) being present if one of the following is true: $y_{k-2} \geq y_k$ and $y_{k-2} > y_{k-4}$ or $y_{k-2} \leq y_k$ and $y_{k-2} < y_{k-4}$. As an associated aspect of the invention, the second comparison logic circuit is connected to a tap providing a $y_{k-2}$ data sample and determines the second logical condition as a flux transition (logical one value) being present if an absolute value of the $y_{k-2}$ data sample is greater than or equal to a set threshold value, and otherwise determines that no flux transition (a logical zero value) is present.

As a further related aspect of the invention, the data field sync pattern detection circuit comprises a series of tapped clock delays, each being connected in tandem to receive and to delay progressively by a period related to the data clock data samples comprising data field sync pattern. A sync pattern logic array is connected to taps along the series of delays for detecting a predetermined sequence of the data samples comprising a valid user data field sync pattern information. In a further related aspect, the data field sync pattern detection circuit is fault-tolerant within plus or minus one clock period in detecting as valid the user data field sync pattern information.

As one more aspect of the present invention, embedded overhead information comprises embedded servo information and embedded sync pattern information and the predetermined taps provide $y_k$, $y_{k-1}$, $y_{k-2}$, $y_{k-3}$ and $y_{k-4}$ data samples; and selection circuitry responsive to a servo field/sync field control signal selects between $y_k$, $y_{k-1}$ and $y_{k-2}$ data samples for servo detection, and $y_k$, $y_{k-2}$ and $y_{k-4}$ data samples for sync detection.

These and other objects, advantages, aspects and features of the present invention will be more fully understood and appreciated upon consideration of the following detailed description of a preferred embodiment, presented in conjunction with the accompanying drawings.

BRIEF DESCRIPTION OF THE DRAWINGS

In the drawings:

FIG. 5 is a simplified diagram of a recording pattern formed on a data storage surface of the FIG. 4 disk drive, illustrating data zones and embedded servo sector patterns.

FIG. 6 is an enlarged lineal depiction of a segment of one data track within the multiplicity of data tracks defined within the FIG. 5 data layout plan, illustrating one data field which has been split into segments by regularly occurring embedded servo sectors.

FIG. 18 is a table illustrating fault tolerance in detection of the FIG. 17A sync pattern in accordance with aspects of the present invention.

In the electrical block diagrams briefly described above, various vertical boxes containing hatching sometimes appear. In some but not all instances, these boxes are described in the following text. In all cases, these boxes represent clock cycle delay registers. Thus, by counting the number of vertical hatched boxes within a particular block or path, the reader will determine the number of clock cycle delays.

SYSTEM OVERVIEW

Figure 4:
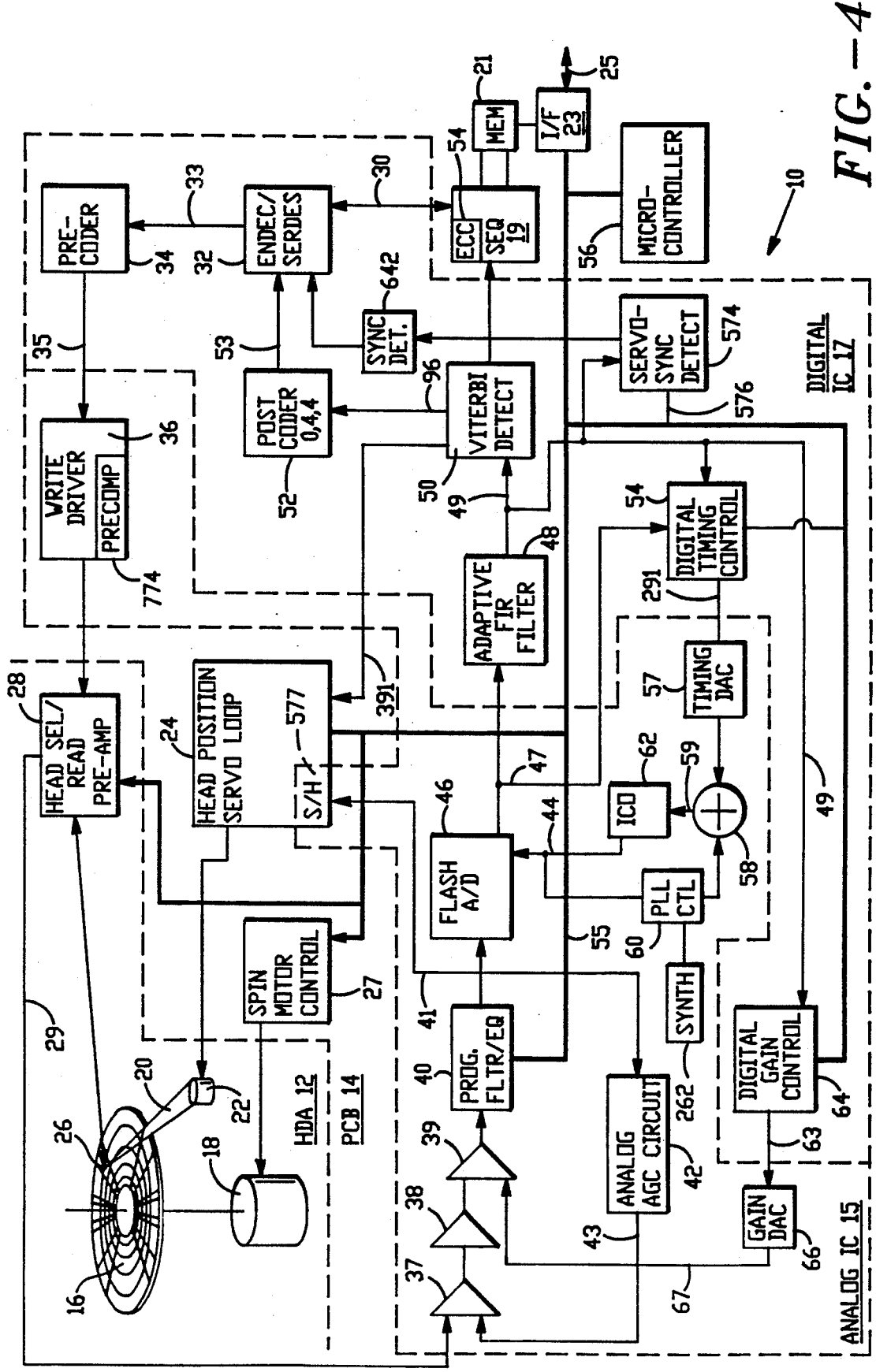
FIG. 4 is a simplified overall system block diagram of a disk drive including a PR4, ML write/read channel architecture incorporating principles and aspects of the present invention.

With reference to FIG. 4, an exemplary high performance, high data capacity, low cost disk drive 10 incorporating a programmable and adaptive PR4,ML write/read channel in accordance with the principles of the present invention includes e.g. a head and disk assembly ("HDA") 12 and at least one electronics circuit board (PCB) 14. The HDA 12 may follow a wide variety of embodiments and sizes. One example of a suitable HDA is given in commonly assigned U.S. Pat. No. 5,027,241. Another suitable HDA is described in commonly assigned U.S. Pat. No. 4,669,004. Yet another suitable HDA is described in commonly assigned U.S. Pat. No. 5,084,791. Yet another HDA arrangement is illustrated in commonly assigned, copending U.S. patent application Ser. No. 07/881,678, filed on May 12, 1992, and entitled "Hard Disk Drive Architecture". The disclosures of these patents and this application are incorporated herein by reference thereto.

The electronics PCB 14 physically supports and electrically connects the circuitry for an intelligent interface disk drive subsystem, such as the drive 10. The electronics circuitry contained on the PCB 14 includes an analog PR4, ML read/write channel application-specific integrated circuit (ASIC) 15, a digital PR4, ML read/write channel ASIC 17, a data sequencer and cache buffer controller 19, a cache buffer memory array 21, a high level interface controller 23 implementing a bus level interface structure, such as SCSI II target, for communications over a bus 25 with a SCSI II host initiator adapter within a host computing machine (not shown). A micro-controller 56 includes a micro-bus control structure 55 for controlling operations of the sequencer 19, interface 23, a servo loop 24, a spindle motor controller 27, a programmable analog filter/equalizer 40, adaptive FIR filter 48, Viterbi detector 50, and a digital timing control 54 as well as a digital gain control 64. The micro-controller 56 is provided with direct access to the DRAM memory 21 via the sequencer/memory controller 19 and may also include on-board and outboard read only program memory, as may be required or desired.

The printed circuit board 14 also carries circuitry related to the head positioner servo 24 including e.g. a separate microprogrammed digital signal processor (DSP) for controlling head position based upon detected actual head position information supplied by a servo peak detection portion of the PR4,ML read channel and desired head position supplied by the microcontroller 56. The spindle motor control circuitry 27 is provided for controlling the disk spindle motor 18 which rotates the disk or disks 16 at a desired angular velocity.

The HDA 12 includes at least one data storage disk 16. The disk 16 is rotated at a predetermined constant angular velocity by a speed-regulated spindle motor 18 controlled by spindle motor control/driver circuitry 27. An e.g. in-line data transducer head stack assembly 20 is positioned e.g. by a rotary voice coil actuator 22 which is controlled by the head position servo loop circuitry 24. As is conventional, a data transducer head 26 of the head stack assembly 20 is associated in a "flying" relationship over a disk surface of each disk 16. The head stack assembly 20 thus positions e.g. thin film data transducer heads 26 relative to selected ones of a multiplicity of concentric data storage tracks 71 defined on each storage surface of the rotating disk 16. While thin film heads are presently preferred, improvements in disk drive performance are also realized when other types of heads are employed in the disclosed PR4, ML data channel, such as MiG heads or magneto-resistive heads, for example.

The heads 16 are positioned in unison with each movement of the actuator and head stack assembly 20, and the resulting vertically aligned, circular data track locations are frequently referred to as "cylinders" in the disk drive art. The storage disk may be an aluminum alloy or glass disk which has been e.g. sputter-deposited with a suitable multi-layer magnetic thin film and a protecting carbon overcoat in conventional fashion, for example. Other disks and magnetic media may be employed, including plated media and or spin-coated oxide media, as has been conventional in drives having lower data storage capacities and prime costs.

A head select/read channel preamplifier 28 is preferably included within the HDA 12 in close proximity to the thin film heads 26 to reduce noise pickup. As is conventional, the preamplifier 28 is preferably mounted to, and connected by, a thin flexible plastic printed circuit substrate. A portion of the flexible plastic substrate extends exteriorly of the HDA 12 to provide electrical signal connections with the circuitry carried on the PCB 14. Alternatively, and equally preferably, the preamplifier 28 may be connected to the other circuitry illustrated in FIG. 4 exteriorly of the HDA 12 in an arrangement as described in the referenced copending U.S. patent application Ser. No. 07/881,678, filed on May 12, 1992, and entitled "Hard Disk Drive Architecture".

A bidirectional user data path 30 connects the digital integrated circuit 17 with the data sequencer and memory controller 19. The data path 30 from the sequencer 19 enters an encoder/decoder ("ENDEC") 32 which also functions as a serializer/deserializer ("SERDES"). In this preferred embodiment, the ENDEC 32 converts the binary digital byte stream into coded data sequences in accordance with a predetermined data coding format, such as (0,4,4) code. This coded serial data stream is then delivered over a path 33 to a precoder 34 which precodes the data in accordance with the PR4 precoding algorithm $1/(1 \oplus D^2)$. The precoded data is then passed over a path 35 to a write driver circuit 36 within the analog IC 15 wherein it is amplified and precompensated by a write precompensation circuit 774 and is then delivered via a head select function within the circuit 28 to the selected data transducer head 26. The head 26 writes the data as a pattern of alternating flux transitions within a selected data track 71 of a block 72 of data tracks defined on a selected data storage surface of the disk 16, see FIGS. 5 and 6. Embedded servo patterns are written by a servo writer, preferably in accordance with the methods described in a commonly assigned U.S. patent application Ser. No. 07/569,065 filed on Aug. 17, 1990, entitled "Edge Servo For Disk Drive Head positioner, now U.S. Pat. No. 5,170,299, the disclosure thereof being hereby incorporated by reference.

Returning to FIG. 4, during playback flux transitions sensed by the e.g. thin film data transducer head 26 as it flies in close proximity over the selected data track 71 are preamplified by the read preamplifier circuit 28. The preamplified analog signal (or "read signal") is then sent to the analog IC 15 on a path 29 and into an analog variable gain amplifier (VGA) 37, a fixed gain amplifier 38, and a second VGA 39. After controlled amplification, the read signal is then passed through a programmable analog filter/equalizer stage 40. During non-read times, an analog automatic gain control circuit 42 feeds an error voltage to a control input of the VGA 37 over a control path 43. During read times, a digital gain control value from a digital gain control circuit 64 is converted into an analog value by a gain DAC 66 and applied over a path to control the second VGA 39, while the analog error voltage on the path 43 is held constant.

The analog filter/equalizer 40 is programmed so that it is optimized for the data transfer rate of the selected data zone 70 from within which the transducer head 26 is reading data. The equalized analog read signal is then subjected to sampling and quantization within a high speed flash analog to digital (A/D) converter 46 which, when synchronized to user data, generates raw data samples $\{x_k\}$.

Figure 1:
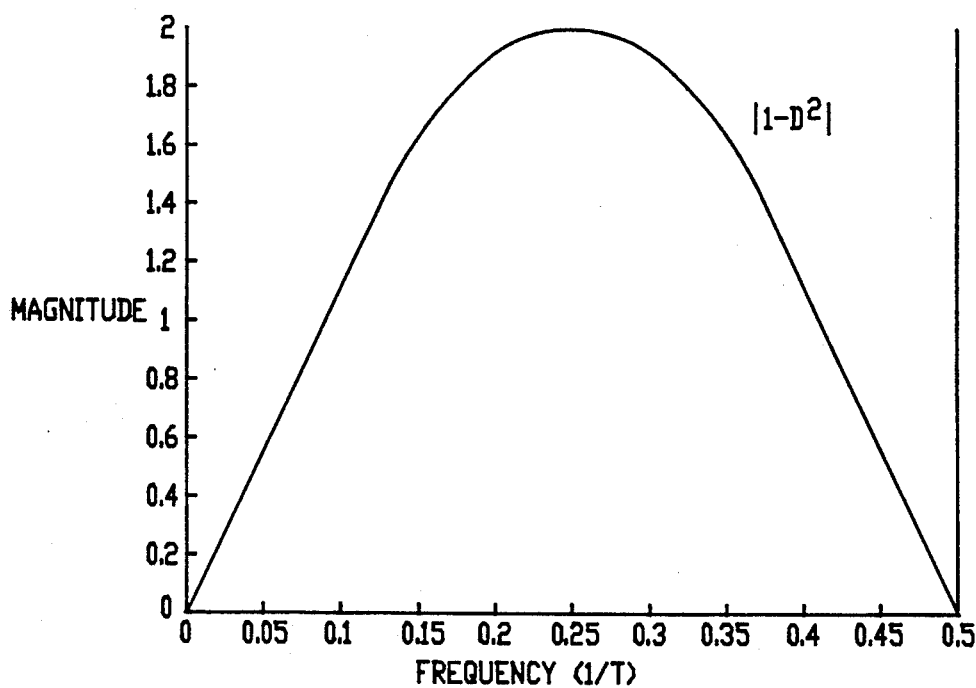
FIG. 1 is a graph of an idealized PR4 channel magnitude response spectrum.
Figure 2:
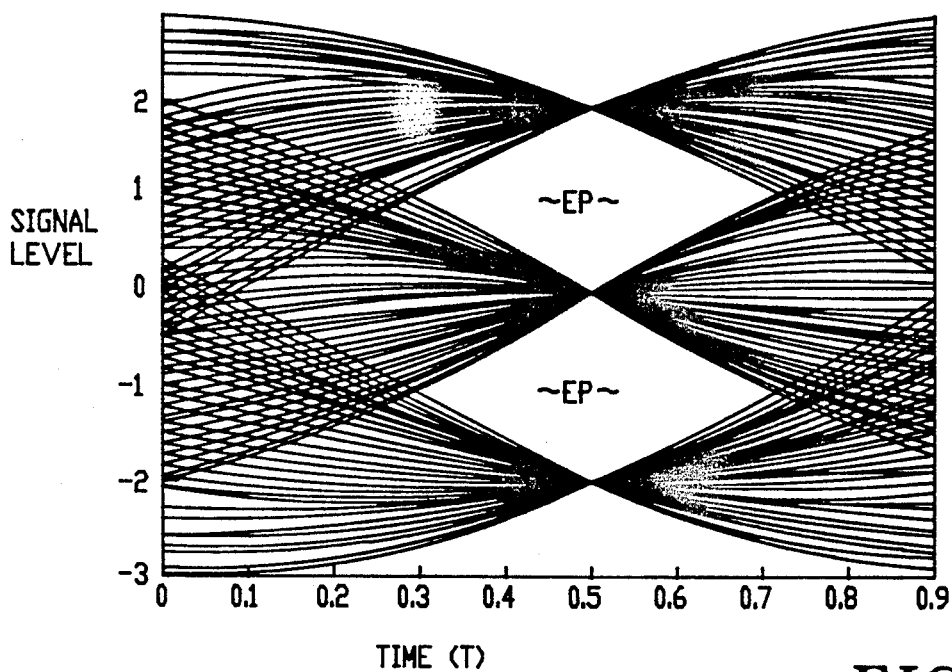
FIG. 2 is an exemplary ternary or "eye" diagram illustrating detection of signal levels in a PR4 channel.
Figure 3:
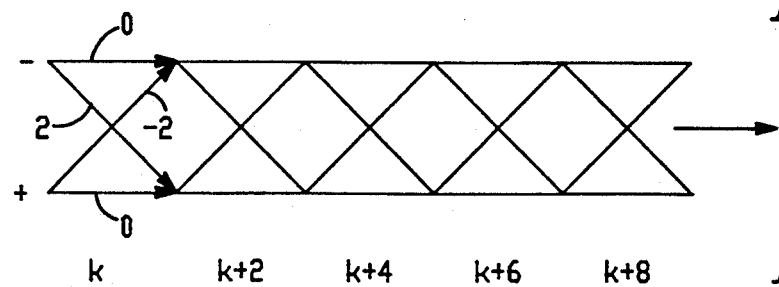
FIG. 3 is a trellis diagram employed by a Viterbi detector in detecting a maximum likelihood data sequence occurring within one interleave of a PR4 data stream.

The FIR filter 48 employs adaptive filter coefficients for filtering and conditioning the raw data samples $\{x_k\}$ in accordance with the desired PR4 channel response characteristics, as plotted in FIG. 1, in order to produce filtered and conditioned samples $\{y_k\}$. The bandpass filtered and conditioned data samples $\{y_k\}$ leaving the filter 48 are then passed over a path 49 to the Viterbi detector 50 which detects the data stream, based upon the Viterbi maximum likelihood algorithm employing a lattice pipeline structure implementing a trellis state decoder of the type illustrated in FIG. 3, for example. At this stage, the decoded data put out on a path 96 is in accordance with a (0,6,5) coding convention. A postcoder 52 receives the (0,6,5) coded data stream and restores the original (0,4,4) coding convention to the decoded data. The restored (0,4,4) coded data stream is decoded from the (0,4,4) code and deserialized by the ENDEC/SERDES 32 which frames and puts out eight bit user bytes which then pass into the sequencer 19 over the data path 30.

In order for the present system to work properly, the raw data samples $\{x_k\}$ must be taken on the incoming analog signal waveform at precisely proper, regular locations. A dual mode timing loop is provided to control the frequency and phase of the flash analog to digital converter 46. The timing loop includes an analog timing control circuit 60, and a digital timing control circuit 54 and a timing DAC 57. A timing phase locked synthesizer circuit 262 supplies synthesized timing signals to the control circuit 60 and a timing reference signal to a summing junction 58. A sum put out by the summing junction 58 controls a current controlled oscillator 62 in order to clock the A/D 46. The oscillator 62 also includes zero phase start circuitry to provide controlled startup at an approximately correct phase with the incoming data samples.

In order to achieve full utilization of the flash A/D 46, a dual mode gain loop is also provided. The gain loop includes the analog gain control circuit 42 which controls the first VGA 37, and a digital gain control circuit 64 and the gain DAC 66 which controls the second VGA 39.

DATA RECORDING PATTERN

As shown in FIG. 5, an exemplary data storage surface of a storage disk 16 comprises a multiplicity of concentric data tracks 71 which are preferably arranged in a plurality of data recording zones 70 between an inner landing zone area LZ and a radially outermost peripheral data track zone 70-1. In the illustrated example, the data tracks are shown as arranged into e.g. nine data zones including the outermost zone 70-1, and radially inward zones 70-2, 70-3, 70-4, 70-5, 70-6, 70-7, 70-8 and 70-9, for example. In practice, more zones, such as 16 zones, are presently preferred. Each data zone has a bit transfer rate selected to optimize areal transition domain densities for the particular radius of the zone. Since the number of available magnetic storage domains varies directly as a function of disk radius, the tracks of the outermost zone 70-1 will be expected to contain considerably more user data than can be contained in the tracks located at the innermost zone 70-9. The number of data fields, and the data flux change rate will remain the same within each data zone, and will be selected as a function of radial displacement from the axis of rotation of the storage disk 16.

FIG. 5 also depicts a series of radially extending embedded servo sectors 68 which e.g. are equally spaced around the circumference of the disk 16. As shown in FIG. 6, each servo sector includes a servo preamble field 68A, a servo identification field 68B and a field 68C of circumferentially staggered, radially offset, constant frequency servo bursts, for example. In addition to data fields 76 which store user data information and error correction code syndrome remainder values, for example, each data track has certain overhead information such as the FIG. 6 data block header fields 74, and data block ID fields 78. While the number of data sectors per track varies from data zone to data zone, in the present example, the number of embedded servo sectors 68 per track remains constant throughout the surface area of the disk 16. In this present example the servo sectors 68 extend radially and are circumferentially equally spaced apart throughout the extent of the storage surface of the disk 16 so that the data transducer head 26 samples the embedded servo sectors 68 while reading any of the concentric tracks defined on the data storage surface. Also, the information recorded in the servo ID field 68B of each servo sector 68 is e.g. prerecorded with servowriting apparatus at the factory at a predetermined relative low constant frequency, so that the servo information will be reliable at the innermost track location, e.g. within the innermost zone 70-9. While regular servo sectors are presently preferred, a pattern of servo sectors aligned with data sectors and therefore unique within each data zone 70 is also within the contemplation of the present invention. Such a pattern is illustrated in U.S. Pat. No. 4,016,603, to Ottesen, for example, the disclosure thereof being hereby incorporated by reference.

Each data sector is of a predetermined fixed storage capacity or length (e.g. 512 bytes of user data per data sector); and, the density and data rates vary from data zone to data zone. Accordingly, it is intuitively apparent that the servo sectors 68 interrupt and split up at least some of the data sectors or fields into segments, and this is in fact the case in the present example. The servo sectors 68 are preferably recorded at a single data cell rate and with phase coherency from track to track with a conventional servo writing apparatus at the factory. A laser servo writer and head arm fixture suitable for use with the servo writer are described in commonly assigned U.S. Pat. No. 4,920,442, the disclosure of which is hereby incorporated herein by reference. A presently preferred servo sector pattern is described in the reference, copending U.S. patent application Ser. No. 07/569,065.

As shown in FIG. 6, a data track 71 includes a data block 76 for storage of a predetermined amount of user data, such as 512 or 1024 bytes of user data, recorded serially in 0,4,4 code bits in data field segments 76A, 76B and 76C of the depicted track segment. The data block 76 is shown in FIG. 6 to be interrupted and divided into segments of unequal length by several servo sectors 68 which contain embedded servo information providing head position information to the disk drive 10. Each data block 76 includes a block ID header field 74 at the beginning of the data block and a data ID header field 78 immediately preceding each data field segment including the segment 76A following the ID header 74, and the segments 76B and 76C following interruption by servo sectors 68. The data header field 78 is written at the same time that data is written to the segments 76A, 76B and 76C for example, and write splice gaps therefore exist just before each data ID header 78, before ID fields, and before servo fields, for example.

ANALOG PROGRAMMABLE FILTER-EQUALIZER 40

The programmable analog filter-equalizer 40 is preferably a 7th order low pass filter with two programmable opposing zeros added for high frequency boost. The filter bandwidth and zero locations are each individually adjustable via control through a serial control port 778 of the analog IC 15 which is written to, and read from, by the microcontroller 56 via the bus 58 and sequencer 19 and a serial data interface to the IC 15. The cutoff frequency and zero locations of the filter 40 are set in relation to the output of a frequency synthesizer 262 within the analog IC 15. The filter 40 is designed so that the output DC bias does not change as the amplitude of the incoming signal stream varies.

Figure 7:
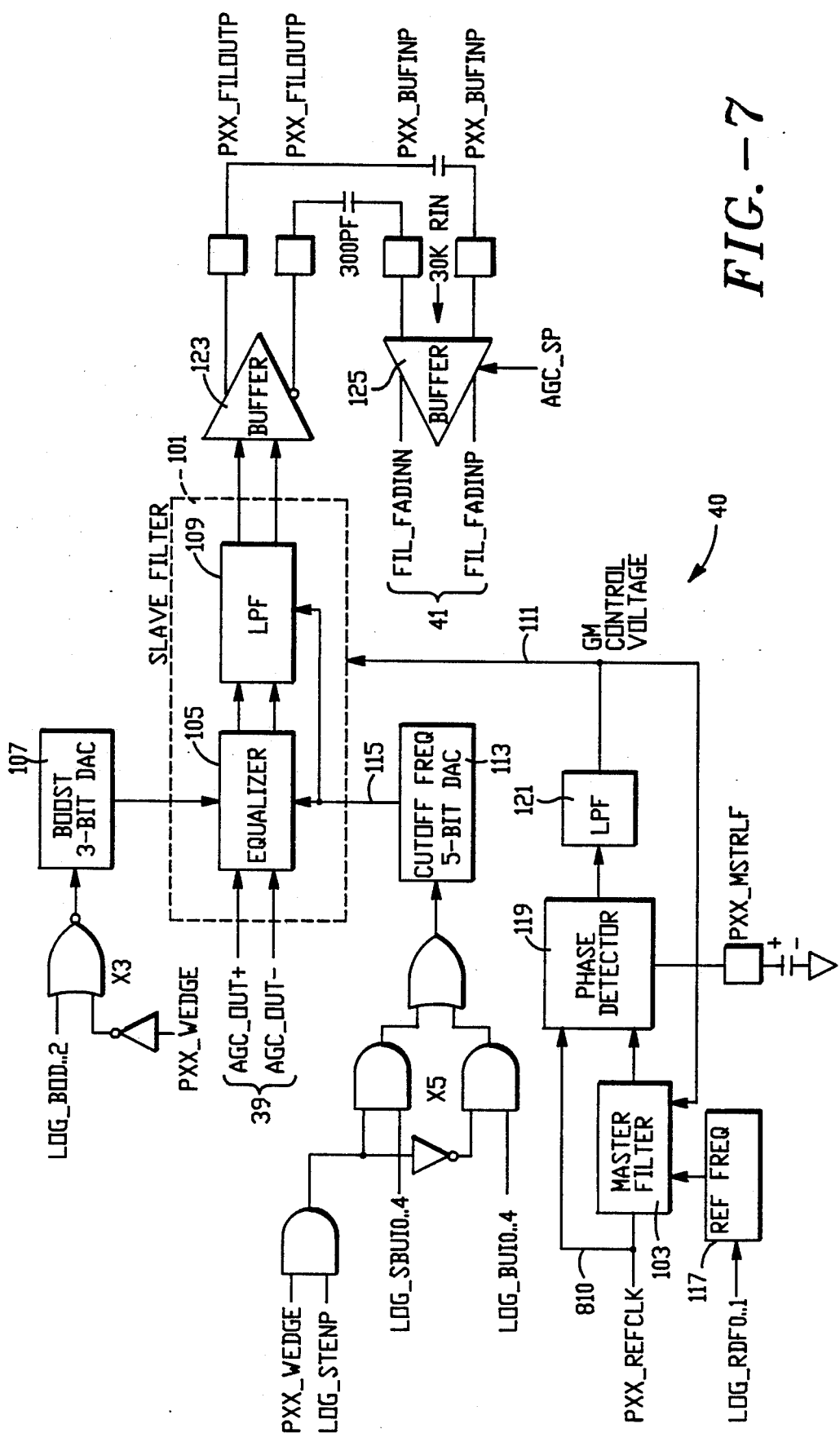
FIG. 7 is a detailed block diagram of a programmable analog filter/equalizer circuit within the FIG. 4 disk drive architecture.

A presently preferred embodiment of the analog adaptive filter-equalizer 40 is shown in FIG. 7. The differential analog signal from the VGA 38 enters the filter-equalizer circuit block 40 on a path 39 and immediately enters a slave filter 101 which is under the control of a master filter 103. The slave filter 101 includes a programmable equalizer 105 having a programmable high frequency boost characteristic which is controlled via a boost control DAC 107 in accordance with three-bit frequency boost programming values held in control registers of the analog IC 15. The DAC 107 controls selection of the two opposed zeros which are symmetrical with respect to the J-omega axis.

Five-bit cutoff frequency information related to data zone (and five bit cutoff frequency related to servo frequency) is supplied from control registers of the analog IC 15 to a cutoff frequency DAC 113 which converts the information into an analog control and supplies the control over a control path 115 to the slave filter 101.

Following analog signal channel equalization in the circuit 105, the analog signal is low pass filtered in a programmable low pass filter 109. The low pass filter is programmed by the master filter 103 in accordance with a Gm control voltage which is sent from a master control loop including the master filter 103 to the slave low pass filter 109 via a path 111.

A system reference clock on a path 810 is distributed to the master filter 103 and to a phase detector 119 within the master filter control loop. An output from the master filter 103 is also applied to the phase detector 119. The master reference clock REFCLK frequency on the path 810 is maintained constant regardless of the particular data zone 70 being followed at any particular time. Two bits comprising control values are transferred into a decode circuit 117. The decode circuit 117 converts the bit selection into an appropriate control signal and applies it to the master filter 103. Any phase error between REFCLK and the output from the master filter 103 is detected by the phase detector 119. A resultant error signal is then low pass filtered and accumulated in a low pass filter 121 and fed back to the master filter 103 (and to the slave filter 109) over the Gm control path 111. Thus, elements 119 and 121 comprise with master filter 103 a phase locked master filter control loop for controlling the characteristics of the slave LPF 109 to maintain it at the desired passband characteristics and cutoff frequency for the selected data zone 70.

The output from the slave filter 101 comprising the equalized, low pass filtered analog read signal is then buffered in a first buffer stage 123, AC coupled to a fixed gain amplifier stage 125 via capacitors connected external to the analog IC 15, and then put out over a path 41 to the flash A/D converter 46.

ADAPTIVE FIR FILTER 48

Figure 8:
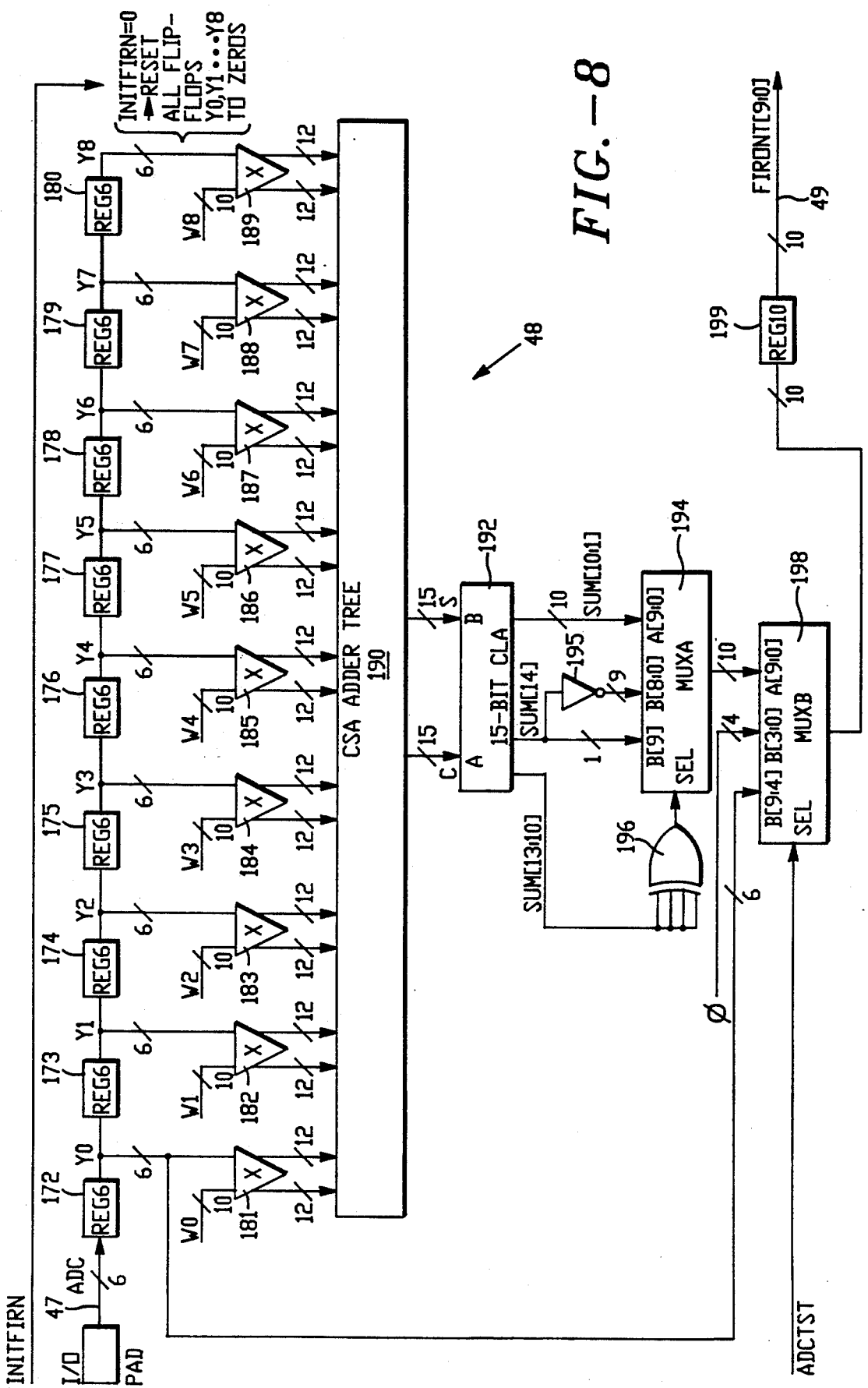
FIG. 8 is a detailed block diagram of a nine-tap programmable digital FIR filter of the FIG. 4 disk drive architecture in accordance with aspects of the present invention.
Figure 14:
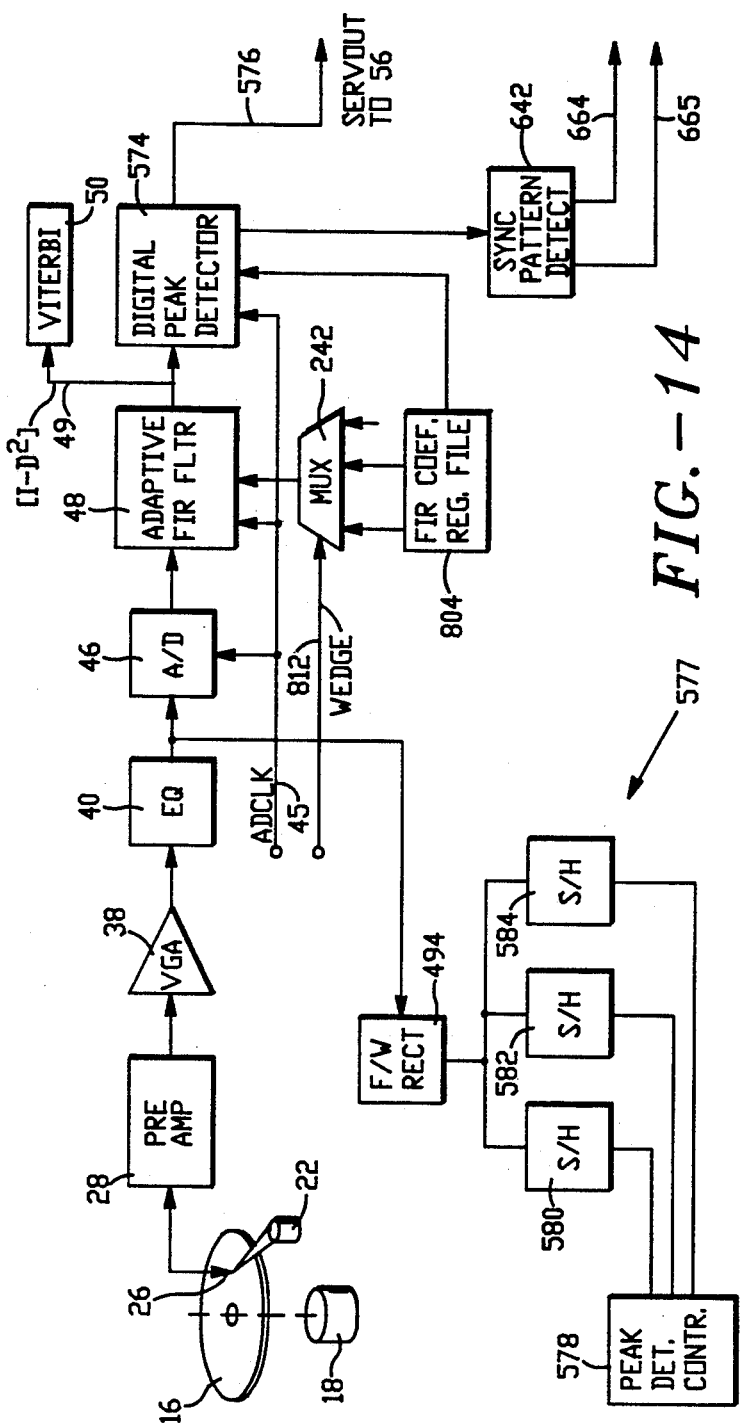
FIG. 14 is an overview block diagram of a portion of the FIG. 4 PR4,ML disk drive architecture relating to detection and decoding of embedded servo information within the FIG. 5 data surface recording plan, in accordance with aspects of the present invention.

The adaptive FIR filter 48 is implemented as a nine tap digital finite impulse response filter generally following the circuitry depicted in FIG. 8. The filter 48 essentially comprises nine clock period, tandem connected delays 172, 173, 174, 175, 176, 177, 178, 179 and 180 connected progressively in tandem from the filter input line 47. There are nine multiplier stages 181, 182, 183, 184, 185, 186, 187, 188 and 189 connected respectively to taps w0 through w8 progressively taken along the delays 172 through 180 as shown in FIG. 14.

A six-level carry-save adder tree 190 employs known carry-save-add techniques to speed summation of the nine multiplier outputs with a minimized number of clock period latencies. A bit-pair recoding multiplier approach is followed in order to speed the multiplication process by enabling consideration of multiple ones of the multiplier bits simultaneously. Circuitry used within the multiplier stages 181-189 enabling bit-pair recoding is well known, see for example Cavanagh, *Digital Computer Arithmetic*, McGraw Hill Book Company, New York, N.Y. © 1984, pp, 159-173.

The resultant sums from the adder tree 190 are then combined in a carry lookahead adder circuit 192 and passed through a first multiplexer circuit 194. The sum, comprising bit positions [10:1] is provided directly to the multiplexer circuit 194, while a saturation value generated from sum [14] and an inverter 195 is presented at another input of the multiplexer 194. An overflow circuit comprising an exclusive OR gate 196 compares bits [13:10] of the sum put out by the adder 192 and controls the operation of the multiplexer 194. A second multiplexer 198 enables the FIR filter 48 to be bypassed in accordance with a control signal ADCTST. A cell delay register 199 delays the resultant output from the FIR filter 48 by one clock cycle and then puts conditioned data samples $\{y_k\}$ onto the bus 49.

There are nine 10 bit programmable multiplier coefficients w0, w1, w2, w3, w4, w5, w6, w7 and w8 which respectively feed into the multiplier stages 181 through 189. These programming coefficients w0-w8 control the characteristics of the FIR filter 48. Each coefficient is held in a ten bit register which feeds into each multiplier stage 181 through 189. The programmable multiplier coefficients may be provided from the register file 804 of the digital IC 17. During servo wedge time, servo coefficients are substituted for the data coefficients w0-w8 applicable to a particular data zone. When data zones are changed, new coefficients are provided to adapt the FIR filter 48 to the particular data zone. Thus, whenever data zones are changed, or selection of another data transducer head and data surface is made, or when servo data is being read from a servo sector, the micro-controller 56 obtains new coefficient values (12 bytes) from a storage location (such as the buffer 21) and loads them into a register file 804 of the digital ASIC 17. The new 10-bit coefficient values w0-w8 will then be provided to the multipliers 181-189 thereby to adapt the FIR filter 48 to the changed operating condition.

The filter coefficients may be adapted in real time by a filter coefficient adaptation circuit 222 based upon the incoming user data stream in a process known as "decision-directed" adaption mode. Alternatively, or in addition to decision-directed adaptation, the coefficients may be adapted by an FIR filter training methodology carried out during a calibration routine, as at power on. Both approaches are discussed hereinbelow. During servo signal processing time, when the servo sector 68 interrupts the data field 76, servo coefficients are loaded into the FIR filter 48 to configure it as a low pass filter suitable for filtering the servo ID field information 68B.

The provision of nine taps in the adaptive FIR filter 48 has been discovered to be ideally appropriate within the presently preferred disk drive architecture 10 for a wide variety of responses from presently available thin film data transducer heads. Basically, responses of thin film heads responding to test patterns recorded at varying data densities were measured and recorded. In terms of measured performance compared with FIR filter circuit complexity, diminishing performance gains are realized when the adaptive FIR filter 48 is structurally or functionally extended beyond about nine taps.

The incoming data signal, $x_k$, on the path 47 has a 6 bit resolution extending between $-1$ and $1-2^{-5}$ (as coded in 2s complement notation). The adaptive multiplier coefficients w0-w8 are each 10 bits in resolution, including one sign bit, and nine following fractional positions. When each 6 bit coefficient is multiplied by a 10 bit multiplier, a 16 bit product normally would result. In practice, the multiplier outputs in carry-save form are limited to 12 bits, with three lower order bits being truncated and generation of the final MSB being deferred to the CSA tree 190. In order to detect the overflow that might occur when adding the nine multiplier 12-bit results, 15 bits are required at the CSA tree 190 output. If there is an overflow in the CLA 192 output, the 10-bit result is saturated at values of either $-1$ or $1-2^{-9}$, depending upon sign.

In practice, the FIR filter 48 is adapted to different head responses. Every data transducer head will be expected to have a different response to data recorded in each one of the data zones shown in FIG. 5. The filter coefficients w0-w8 are adapted so that the action of filtering the read signal generated by a particular head and zone produces output samples corresponding to a PR4 $(1-D^2)$ response. This adaptability thus enables acceptance and use of a much broader range of heads and media in manufacturing. The resultant disk drive system 10 can thus have relaxed tolerances for heads and media relative to a drive having only a fixed filter. Another advantage is that there is no need to compromise for various locations and characteristics from the disk. The FIR filter 48 can be adaptively optimized in real time for every zone, instead of being restricted to a single, compromised setting for all zones.

While it is understood in the art that 6 bits of resolution are needed for the samples $x_k$ at the input path 47, the need for 10 bits of resolution in the adaptive update of the filter coefficients has not generally been known or understood. This 10 bit requirement results from use of the "signed LMS" (least mean square) algorithm.

ADAPTATION OF FIR FILTER 48

As previously mentioned, the digital FIR filter 48 is capable of being adapted to the channel conditions so as to produce the desired PR4 channel response as graphed in FIG. 1. As noted above, the preferred adaptive algorithm used to adapt the FIR filter 48 is the so-called "signed-LMS" algorithm described by:

$$w_{k+1} = w_k - \mu e_k \text{sgn}(x_k) \quad (1)$$

where $w_k = [w0, w1 \ldots w8]$ is a vector of filter coefficients at time k, $\mu = 2^{-p}$, where ($1 \leq p \leq 8$), is a programmable step size, $e_k = y_k - \text{dkval} \cdot \hat{y}_k$, and $x_k = [x_k, x_{k-1} \ldots x_{k-8}]$ is a vector of delayed filter input values. The variable $\hat{y}_k$ represents the filter output, and the variable $y_k$ represents the "desired response"; i.e., the desired filter output value at time k. The desired response for $\hat{y}_k$ is 1 if $y_k > \text{THP}$, 0 if $-\text{THP} \leq y_k \leq \text{THP}$, or $-1$ if $y_k < -\text{THP}$. The signum function is defined by:

$$\text{sgn}(x) = 1 \text{ for } x \geq 0 \quad (2)$$

$$= -1 \text{ for } x < 0 \quad (3)$$

By way of further explanation and contrast with the presently preferred method, the standard LMS algorithm is described by:

$$w_{k+1} = w_k - \mu e_k x_k \quad (4).$$

The main drawback of the standard LMS algorithm is the complexity of the $e_k x_k$ multiplication. The present inventors have discovered that by using signed-LMS instead, performance losses as measured by filter output signal-to-noise ratio are very small, and typically less than 0.2 dB. At the same time, complexity in the filter coefficient adaptive update is greatly reduced, since the $e_k x_k$ multiplication is avoided.

Figure 9:
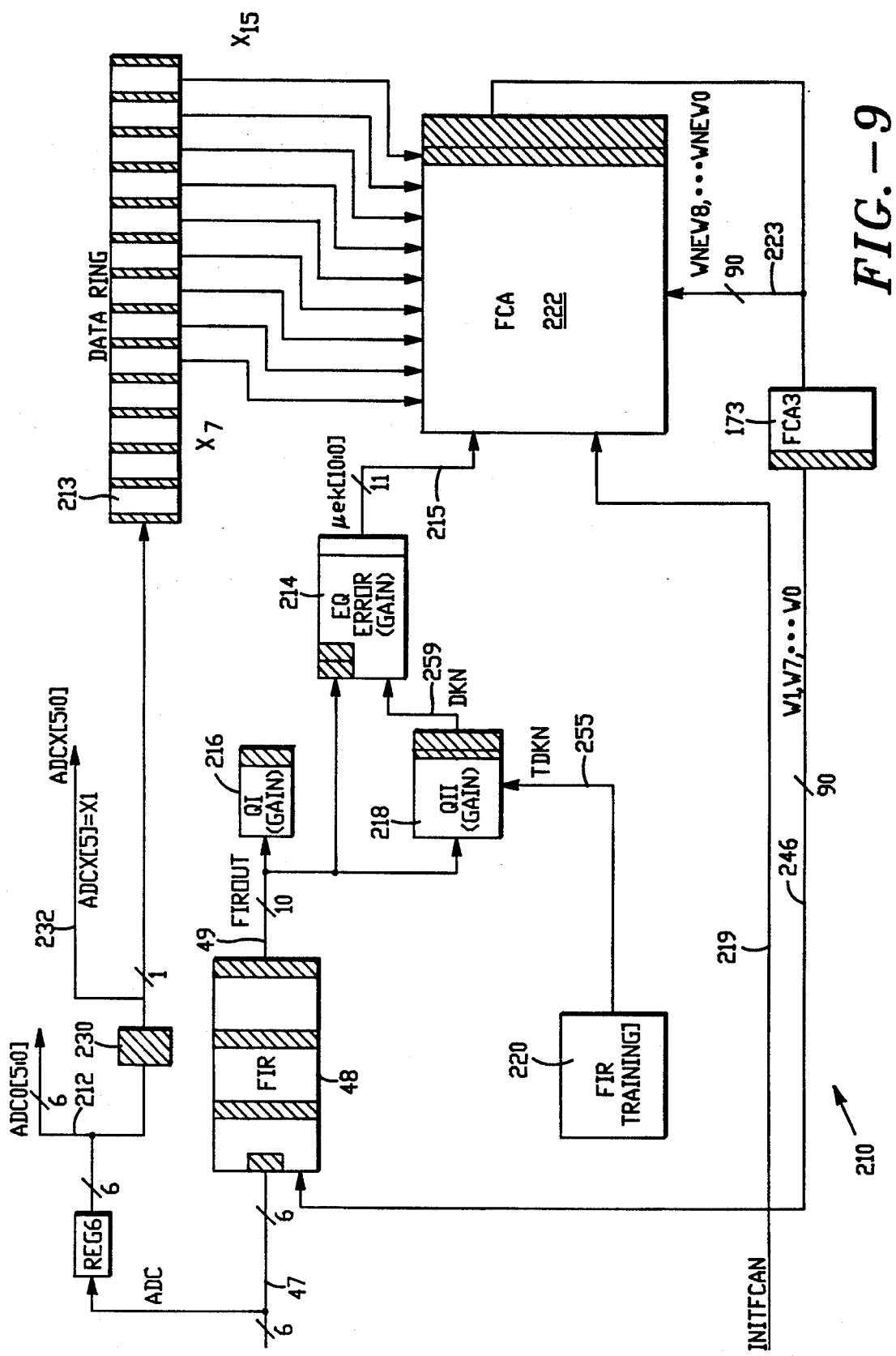
FIG. 9 is a block diagram of an FIR filter coefficient adaptation circuit for adapting the FIG. 8 FIR filter to read channel conditions within the FIG. 4 disk drive architecture.
Figure 13:
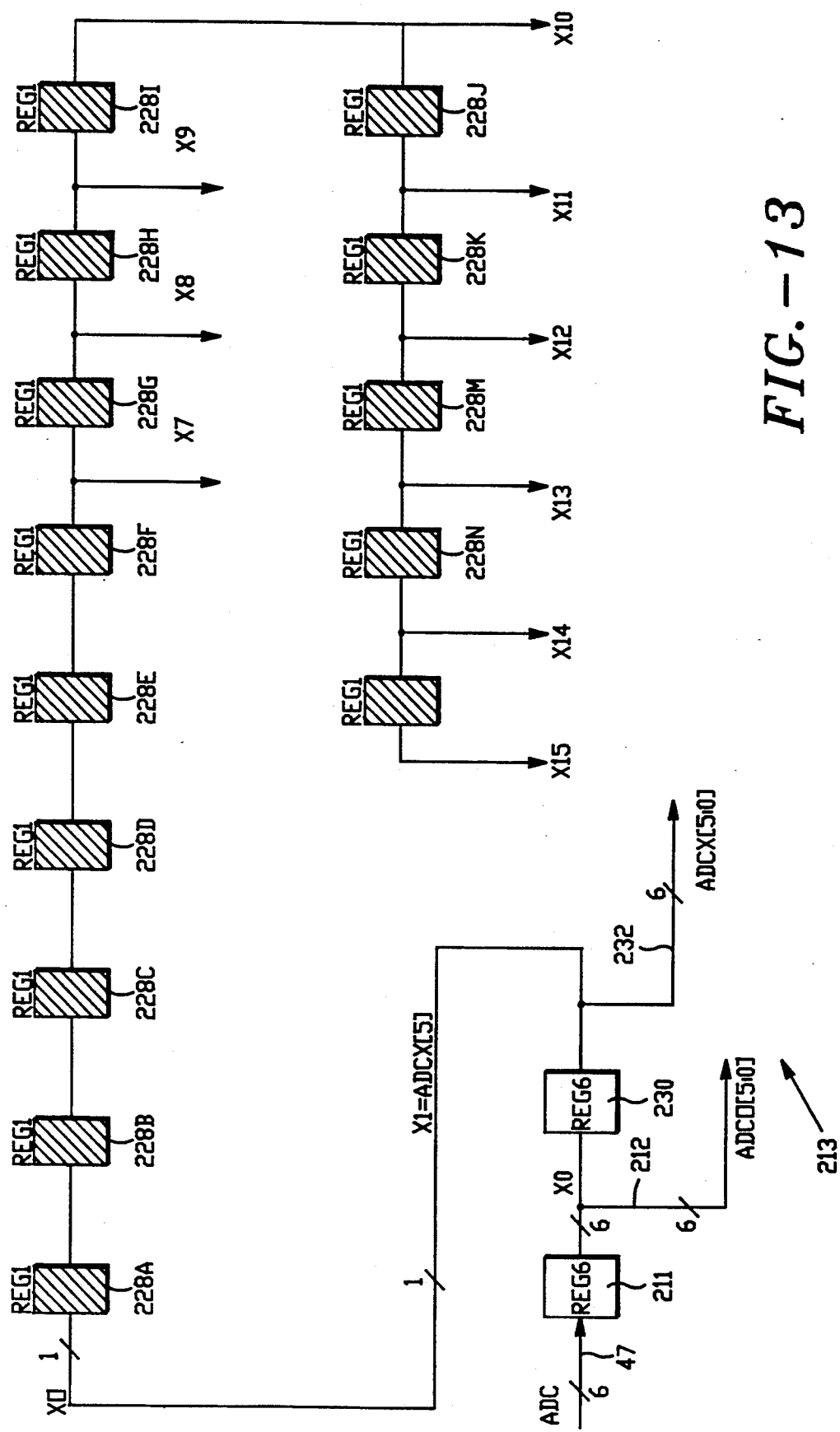
FIG. 13 is a more detailed block diagram of a data ring circuit block shown in FIG. 9.

An overall FIR filter adaptation architecture 210 is illustrated in FIG. 9. The incoming raw data samples on the path 47 are clocked through a register 211 to a path 212, and through a second register 230 to a path 232. The path 232 leads through a data ring 213 (FIG. 13) comprising a series of fourteen flip-flops 228a, 228b, 228c, 228d, 228e, 228f, 228g, 228h, 228i, 228j, 228k, 228m, and 228n, which are synchronously clocked at the ADCLK rate. Outputs from the sixth through the fourteenth flip-flops provide respectively X[7] through X[15] values which are applied as multiplier values to a filter coefficient adaptation circuit 222, described in greater detail in connection with FIGS. 10 and 11.

As shown in FIG. 4, the output path 49 from the FIR filter 48 leads directly to the digital gain control circuit 64. Several of the elements of the gain control circuit 64 are shown in FIG. 9 and are used with the filter coefficient adaptation circuit 222 to provide updated filter coefficients. One of the elements of the digital gain control circuit 64 is an equalizer error computation block 214. Other elements include a first gain quantization block 216 which is normally active during an initial gain acquisition mode to set the PR4, ML channel gain, and a second gain quantization block 218 which is normally active during a subsequent tracking mode to maintain proper gain characteristics in the PR4, ML channel while user data is being read. The second gain quantization block 218 also provides an output dkn which feeds into the equalizer error block 214. The equalizer error block 214 within the gain control circuit 64 calculates and puts out $\mu e_k$ values on a path 215 to the filter coefficient adaptation circuit 222. An FIR filter training circuit 220 provides an output TDKn on a path 255 which feeds into the second gain control block 218.

Figure 10:
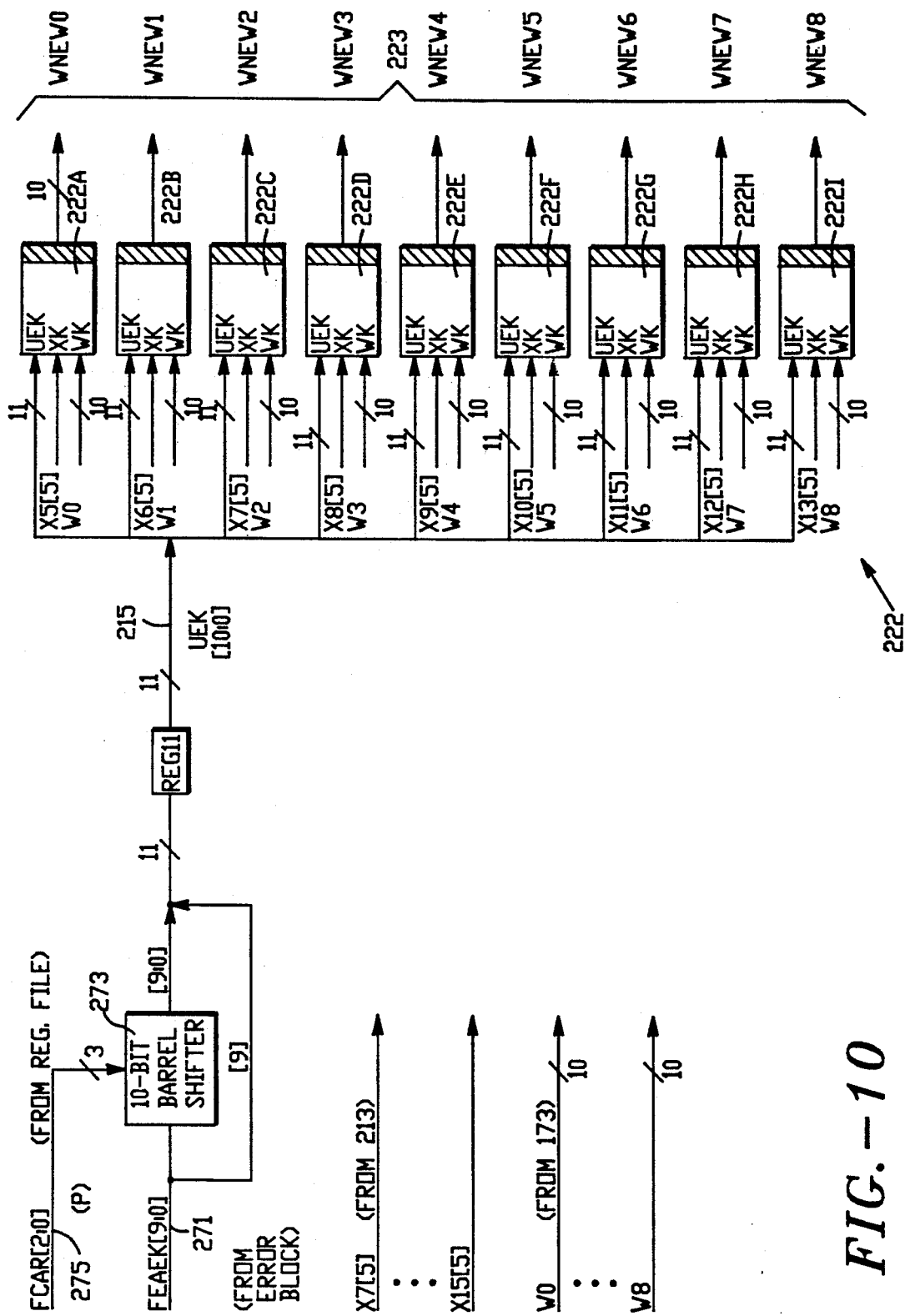
FIG. 10 is a detailed block diagram of a portion of the filter coefficient adaptation circuit block shown in FIG. 9.

The filter coefficient adaptation circuit 222 includes nine coefficient calculation circuits 222a, 222b, 222c, 222d, 222e, 222f, 222g, 222h, and 222i, as shown in FIG. 10. These circuits implement a signed least mean squares recursive coefficient adaptation methodology which is preferred in providing coefficient adaptation in accordance with the equation:

$$w_{k+1} = w_k - \mu e_{k-L} \text{sgn}(x_{k-L}) \quad (1')$$

wherein all variables are as defined above. It should be noted that in order to achieve a high speed implementation, pipelining is used. The pipelined architecture introduces the delay term "L" in the update term of equation (1').

Figure 11:
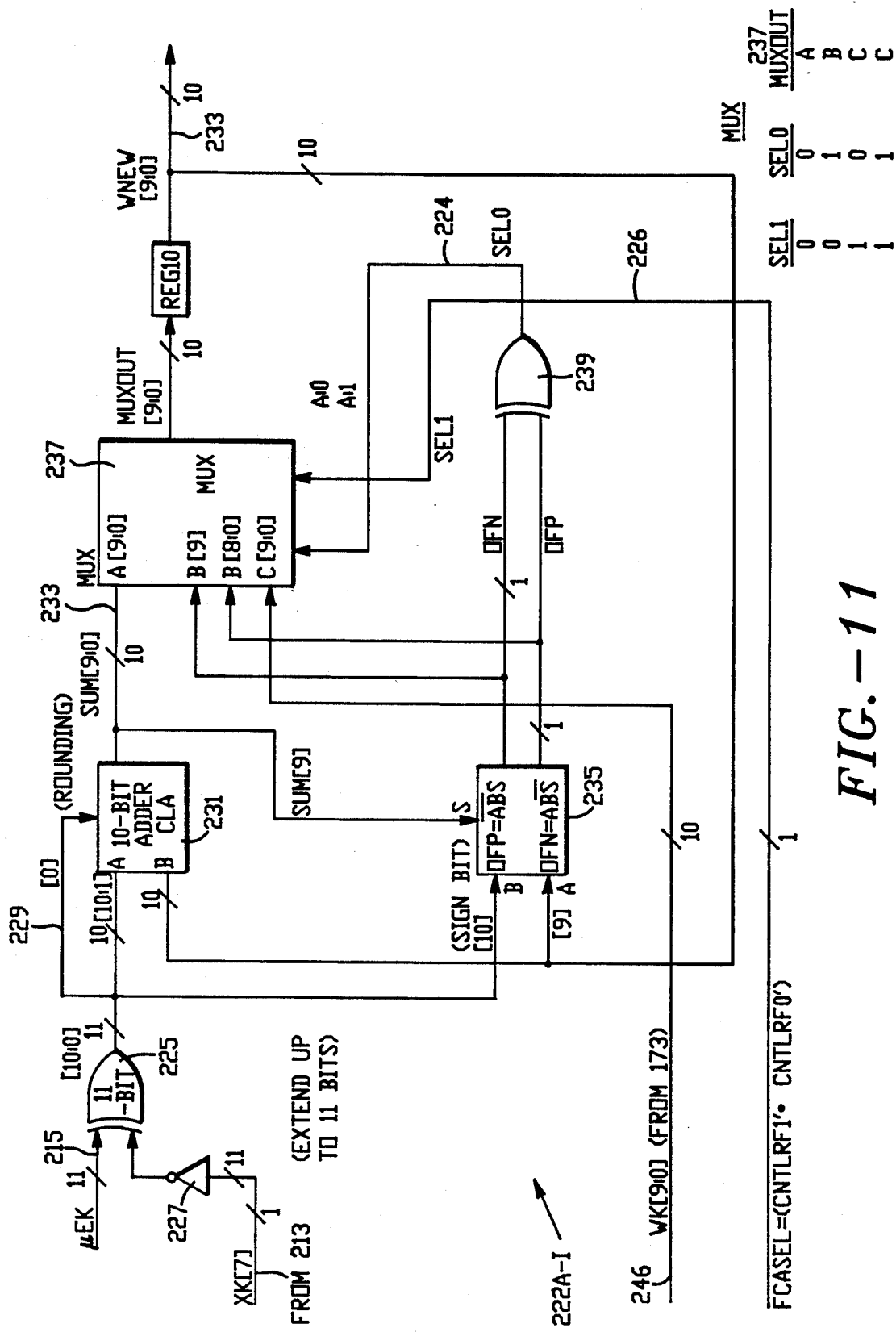
FIG. 11 is a detailed block diagram of one of nine processing circuits within the FIG. 10 filter coefficient adaptation circuit block.
Figure 12:
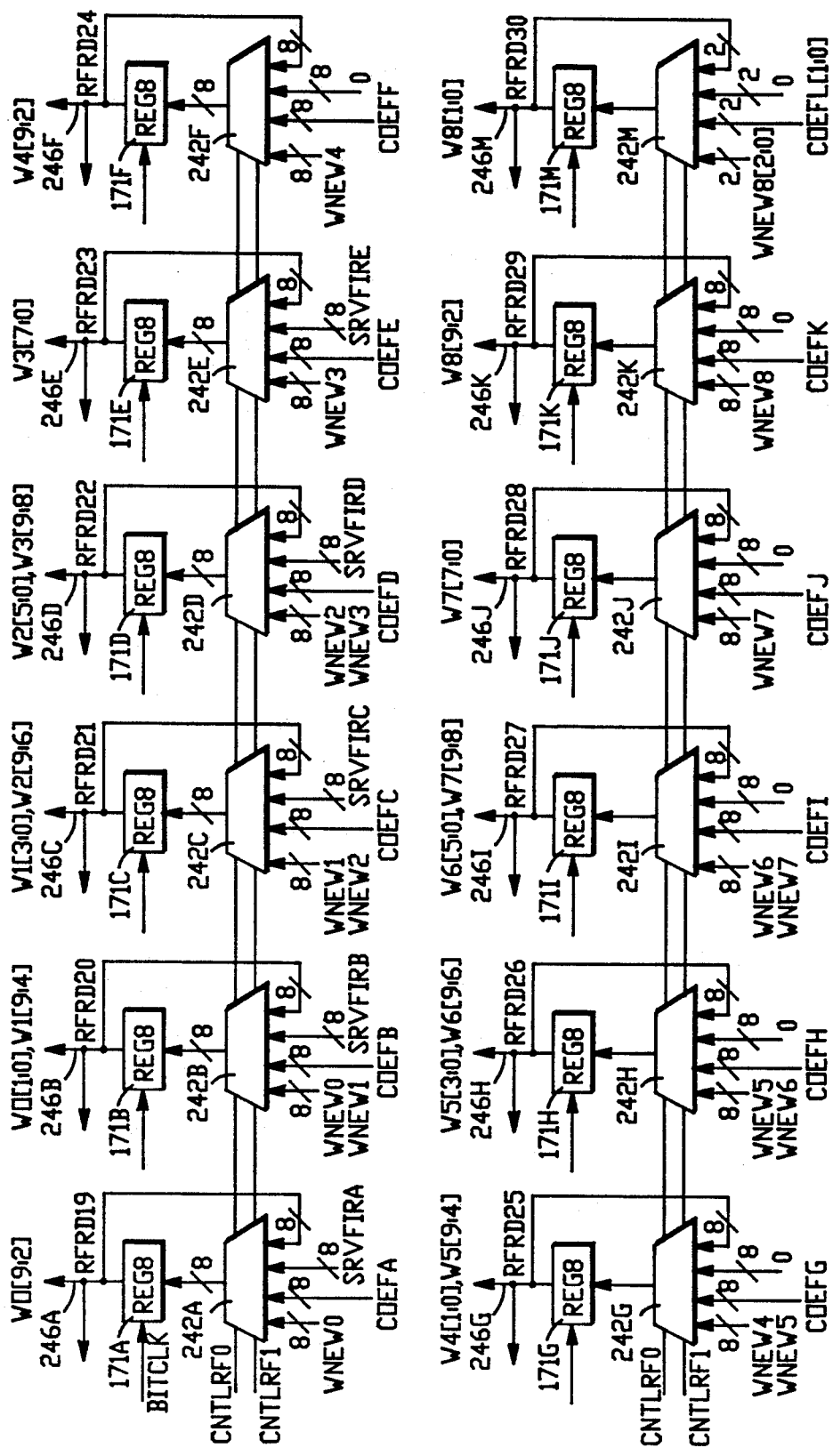
FIG. 12 is a block diagram of a coefficients multiplexer array used selectively to provide coefficient values to the FIG. 8 FIR filter.

A representative one of the calculation circuits 222a-i, is illustrated in FIG. 11. Therein, the $\mu e_k$ value on the path 215 is multiplied by a number which is the inverse of the bits $x_k$ from the data ring 213. An exclusive-OR gate 225 and an inverter 227 implement the multiplication. The resultant eleven bits of the product are applied on a path 229 to one input of a ten-bit carry look-ahead adder 231. Another input to the adder 231 is provided by the coefficients $w_{new}$ which are applied over a path 223. The resultant sum put out over a path 233 comprises the updated ten bit coefficient. An overflow logic circuit 235 monitors the sum on the path 233 and provides positive and negative saturation outputs in the event of overflow. The sum on the path 233 and the positive and negative saturation values are applied as inputs to a multiplexer 237. An OR gate 239 tests high bit outputs from the overflow and puts out a control signal SEL0 on a path 224 to cause the multiplexer 237 to select and put out overflow saturation values OFP and OFN, in lieu of the sum, as the new coefficient whenever an overflow has been detected. Another control signal SEL1 on a path 226 causes the multiplexer 237 to be preset with and put out coefficients wk supplied from the coefficient selector circuit 173 (FIG. 12). The control SEL1 overrides the control SEL0.

Turning to FIG. 12, the coefficient selector circuit 173 includes twelve eight bit registers 171a, 171b, 171c, 171d, 171e, 171f, 171g, 171h, 171i, 171j, 171k and 171m, which are provided to hold the nine ten-bit coefficients. Since these are eight bit registers, several registers are needed to hold the bits of each ten bit coefficient. The last register 171m only holds two bits. There are twelve multiplexers 242a-m which are also associated with the twelve registers 171a-m, and each multiplexer 242 includes four inputs, controlled by two control lines CNTLRF0 and CNTLRF1. One input is the updated coefficient $w_{new}$ which is recursively generated and put out by the filter coefficient adaptation circuit 222. Another input COEF is provided directly from a control register file 804 contained within the digital IC 17. This file is written by the microcontroller 56 via the bus 58, and it holds coefficients w0-w8 for e.g. a newly selected data zone 70 which is being accessed by the head positioner servo 24, for example. These coefficient values are typically values which were developed during the FIR training routine from the training track of a particular zone, or which were the most recent values developed by the adaptation circuit 222 when the particular data zone was last accessed. However, these values are static values. A third input to registers 242a-e is provided for the servo coefficient values SRVFIRA-E which are also stored in the register file 804. In servo mode, registers 242f-m are loaded with null (zero) values. A final input to the registers 242a-m is a loop back path 246 taken from the output of each register 171 and which thereby implements and provides a latch function for holding the present coefficient value being applied to the multipliers 188-204.

ASYNCHRONOUS SERVO DATA DETECTION WITH PR4, ML CHANNEL

While a PR4, ML channel may be used within disk drives employing a myriad of head positioning methods, a presently preferred method is to employ a series of circumferentially spaced apart, radially extending embedded servo sectors 68 as shown in FIGS. 5 and 6. With the approach described hereinabove in conjunction with FIGS. 5 and 6, a plurality of radial data zones 70-1 to 70-9 enable a significantly greater amount of user data to be stored on each disk 16 than if areal recording densities were limited to the density available at the innermost circumferential zone, e.g. zone 70-9 in the FIG. 5 example. While the data transfer rates are increased from the inner zone 70-9 to the outermost zone 70-1, the data transfer rate within each servo sector 68 is selected to be a constant, servo data rate.

The servo AGC acquisition field 68a provides in playback a sinewave at e.g. a 6 T period. This fixed short duration sinewave is needed to reset the gain of the PR4,ML channel in the manner described above for adjustment of the analog gain loop. A reference clock REFCLK related to the servo frequency is put out during servo sector time and will be selected and put out as the ADCLK signal on the path 63. However, the ADCLK signal will be asynchronous with respect to incoming servo data, such as the track number data contained within the servo ID number field 68b.

Accordingly, the servo ID number field 68b is written at a very low frequency with respect to the data rate. One presently preferred flux transition pattern for a Gray coded binary zero is: 10 000 010 0; and, a presently preferred flux transition pattern for a Gray coded binary one is: 10 010 000 0. In these examples, 9 timing cells (T) at the servo data rate are required for each binary one or zero of the Gray coded track identification number. Also, flux transitions are not closer than 3 T nor farther apart than 6 T.

With reference to FIG. 14, a servo/sync detector 574 is connected to receive the output of the adaptive FIR filter 48. The WEDGE 0,1 control signals cause the FIR filter coefficients multiplexer 242 to switch from coefficients which are loaded into the FIR filter 48 for the particular data zone 70 to servo coefficients which are then loaded into the FIR filter 48. The servo coefficients are selected to configure the FIR filter 48 into a low pass filter having characteristics tailored to pass the low frequency servo ID field data 68b, but which reject noise and other unwanted higher frequency components in the data stream.

The ADCLK clocking signal on the path 44 is applied to clock the A/D converter 46, the adaptive digital FIR filter 48 and the servo/sync detector 574. The A/D converter 46 puts out quantized samples of the analog data stream which includes the servo ID field data 68b, albeit asynchronously to this servo data. The resultant samples are exemplified as quantization values $y_k, y_{k-1}, y_{k-2}, y_{k-3}, y_{k-4}, y_{k-5}$ in the FIG. 15 waveform graph which are shown to be asynchronous to the peaks and zero crossings of the incoming analog servo data waveform. These low pass filtered servo data quantization values are delivered to the servo/sync detector 574 from the adaptive FIR filter 48 over the path 49. In a manner shortly to be explained, the servo/sync detector 574 determines whether each data sample represents a transition or non-transition within the e.g. nine T cell string comprising a single servo binary bit, and puts out a logical high or low signal on a path 586 during each T cell period of the servo sector ID field 68b.

The servo detection circuit also includes peak detection circuitry including a peak detector controller circuit 578, and e.g. three peak detectors 580, 582 and 584, which sequentially sample the A, B and C burst peaks in the servo burst field 68C. Absolute peak values are provided to the detectors 580, 582 and 584 by the full wave rectifier 494 in the analog gain loop. The peak detection method for determination of track centerline information is as described in the referenced, commonly assigned U.S. Patent Application Ser. No. 07/569,065 filed on Aug. 17, 1990, now U.S. Pat. No. 5,170,299.

Figure 16:
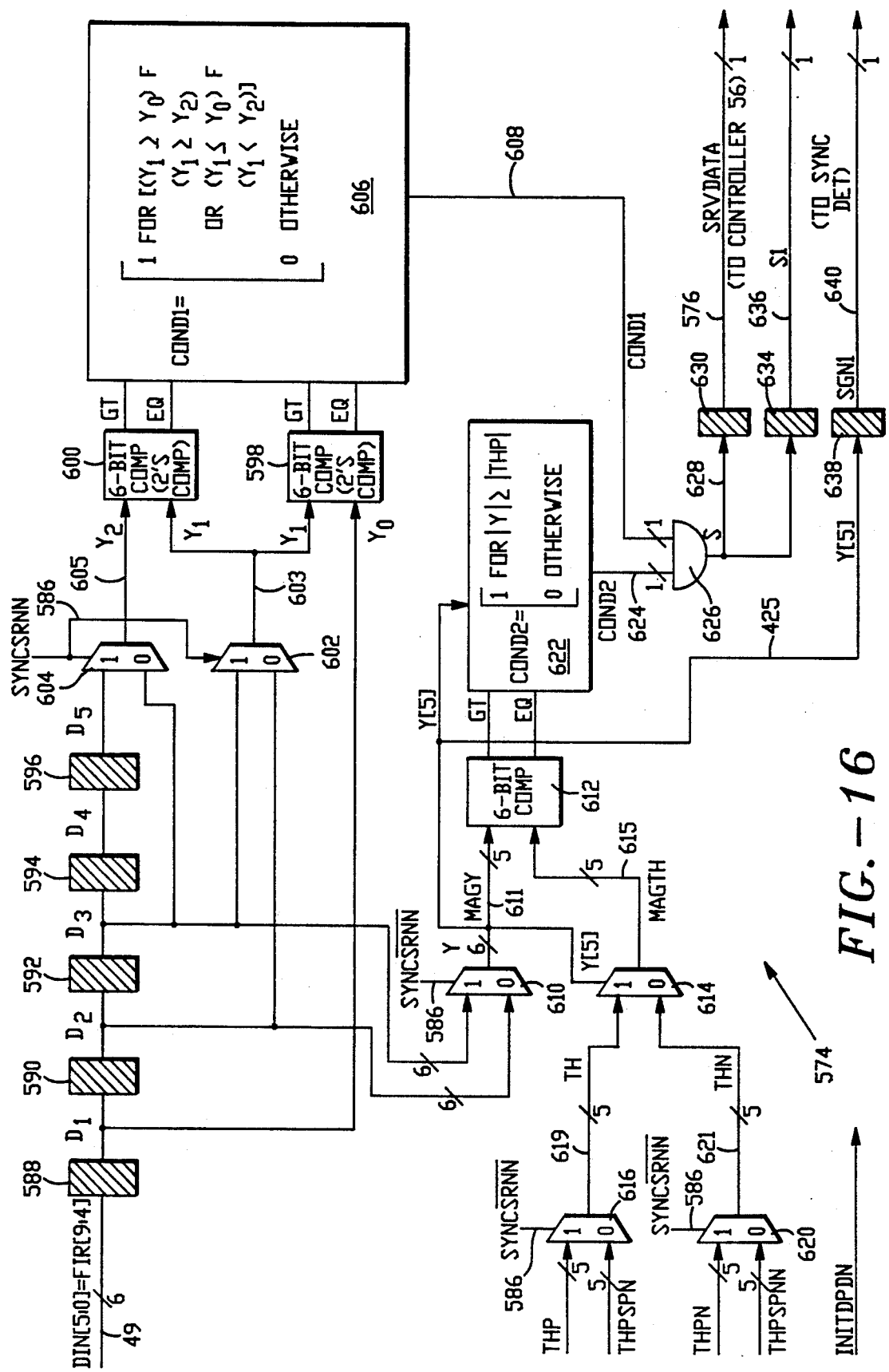
FIG. 16 is a detailed block diagram of the servo/sync digital peak detector included within the FIG. 40 servo circuit block diagram.

With reference to FIG. 16 details of the servo/sync detector 574 are shown. During servo mode in which a SYNCSRVN control line 586 is low, the servo detector 574 is configured to detect asynchronously the servo data within the servo ID field 68b. During a sync field detection mode, the detector 574 is configured to assist in detection of a sync pattern within the sync field of the data ID field header 78 which is needed to resynchronize the byte clock within the ENDEC/SERDES 32. Also, during an FIR filter training mode, the detector 574 assists in detecting the sync polarity and indicates when to start the training sequence comparison. Detection of the data field sync pattern is described in the next section hereof.

The incoming quantized and filtered samples $y_k$ on the path 49 comprise the high order six bits (FIR [9:4]) which have been low pass filtered by servo mode coefficients of the adaptive FIR filter 48 loaded into the FIR filter during servo time. These values are then latched through five tandem-connected flip-flop latches 588, 590, 592, 594 and 596, which are clocked at the ADCLK bit clock rate put out during servo sector time. A once delayed value d1 is passed from the output of the first latch 588 to one input of a six bit 2s complement comparator 598. A twice delayed value d2 is passed from the output of the second latch 590 through a six bit SYNC/SERVO multiplexer 602 controlled by the SYNCSRVN control and a resultant path 603 to the other input of the comparator 598, and to an input of a second comparator 600. A three T cell delayed value d3 is put through a six bit SYNC/SERVO multiplexer 604 (also controlled by the SYNCSRVN control) and a path 605 to another input of the second comparator 600.

The comparator 598 compares a value $y_{k-1}$ on the d2 path with a first value $y_k$ signal on the d1 path and puts out greater than (GT) and equal to (EQ) conditions to a logic array 606. The comparator 600 compares the second value $y_{k-1}$ on the path 603 with a third value $y_{k-2}$ on the path 605 and also puts out a greater than (GT) and equal to (EQ) conditions to the logic array 606.

The logic array 606 determines a first condition for characterizing the quantized value $y_{k-1}$. First, if $y_{k-1}$ is a positive value, as determined by a high order sign bit [5] of the six bit quantization value, the array 422 determines that a flux transition (raw "1") is present if $y_{k-1} \geq y_k$ and $y_{k-1} > y_{k-2}$. If $y_{k-1}$ is a negative value (such as value $y_{k-4}$ graphed in FIG. 15) the circuit 606 determines that a flux transition (raw "−1") is present if $y_{k-1} \leq y_k$ and $y_{k-1} < y_{k-2}$. If either of these logical conditions are not determined to be true for $y_{k-1}$, a raw "0" is determined to be present for the servo T cell including the sample $y_{k-1}$. This process is repeated for each sample, and a logical bit line 608 indicates whether a raw 1 or a raw 0 results.

A second condition is also needed for reliable decoding of the servo ID field data 68b, and this condition is that the absolute value of the servo T cell value being considered, e.g. $y_{k-1}$, has a magnitude above a predetermined threshold. Accordingly, the value d2 is passed through a SYNC/SERVO multiplexer 610 and over a path 611 to one input of a 6-bit threshold comparator 612. A positive servo threshold value THPSRV from the register file 804 is selected in lieu of the THP value by a SYNC/SERVO multiplexer 616 and passed over a path 617 and through the threshold polarity multiplexer 614 and path 615 to the other input of the 6-bit threshold comparator 612. Similarly, negative servo threshold value −THPSRV from the register file 804 is selected and passed through a SYNC/SERVO multiplexer 620, path 621, polarity multiplexer 614, and path 615 to the other input of the comparator 612. The multiplexer 614 is controlled by the sign bit (bit [5]) on the path 611.

The comparator 612 puts out greater than (GT) and equal to (EQ) comparison results to a second condition logic array 622. The array 622 determines the presence of a raw "1" if the absolute value of e.g. $y_{k-1}$ is greater than or equal to the absolute value of the selected positive or negative threshold value (THPSRV) as the case may be. In the event that the quantization value $y_{k-1}$ satisfies the first criteria established by the logic circuit 606, it may not satisfy the second criteria established by the logic circuit 622 (as in the case of quantization of noise or extraneous signal components having a value above the FIG. 15 centerline, but below the THPSRV and −THPSRV levels thereof. In such case the second criteria is not satisfied, and a raw "0" value is put out on a path 624.

The paths 608 and 624 come together in an AND circuit 626 which requires that both conditions be true before a raw "1" value is put out on a path 628 to a latch 630. The latch 630 is clocked at the servo clock rate ADCLK established during servo time and feeds a serial bit line 576 which e.g. extends to the system controller 56 which accumulates and frames the raw "1"s and "0"s into nine T cell patterns and then tests each pattern as to whether it denotes a binary one or zero of the Gray coded track ID number 68b. Alternatively, and equally acceptably, a state machine may be employed to decode the raw "1"s and "0" into the binary track number. Commonly assigned U.S. Patent Application Ser. No. 07/710,172 filed on Jun. 4, 1991, describes one presently preferred state machine implementation for decoding the preferred Gray coded track ID number with a dedicated data reader state machine.

Figure 15:
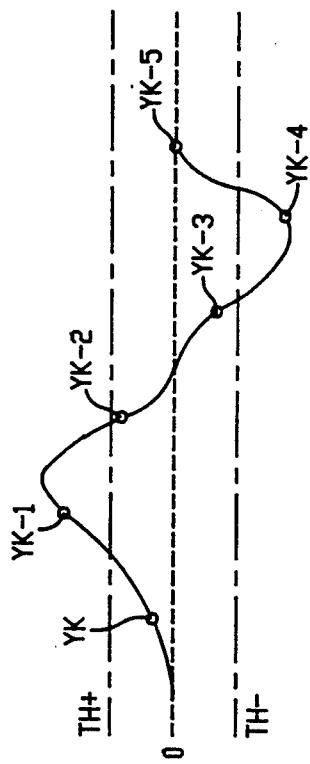
FIG. 15 is a waveform graph illustrating asynchronous sampled data detection of embedded servo track/block identification information within embedded servo sectors of the FIG. 5 data surface recording plan.

In the example provided in FIG. 15, $y_{k-1}$ and $y_{k-4}$ will be determined to be raw "1" values, whereas $y_k$, $y_{k-2}$, $y_{k-3}$ and $y_{k-5}$ will be determined to be raw "0" values.

FAULT TOLERANT DATA ID FIELD SYNC PATTERN DETECTION

As noted above in connection with FIG. 6, each data field includes a data ID field 78. Each data ID field preferably includes a preamble 78A which is reproduced as a 4 T period sinewave at the data rate of the particular data zone 70. The preamble 78A is used by the timing and gain loops to establish correct gain and phase lock relative to the incoming analog signal stream, as previously explained. A sync field pattern 78B is preferably provided immediately following the preamble pattern 78A. The sync field pattern is one which may be (but which does not necessarily have to be) selected to violate the data coding convention, e.g. (0,4,4) code, and serves as a unique address mark for synchronization of the byte clock to the user data field 76 immediately following the data ID field 78. The byte clock is provided to the ENDEC/SERDES 32 and is used to frame user data bytes from the incoming stream of serial code bits being read back from the disk.

Figure 17A:
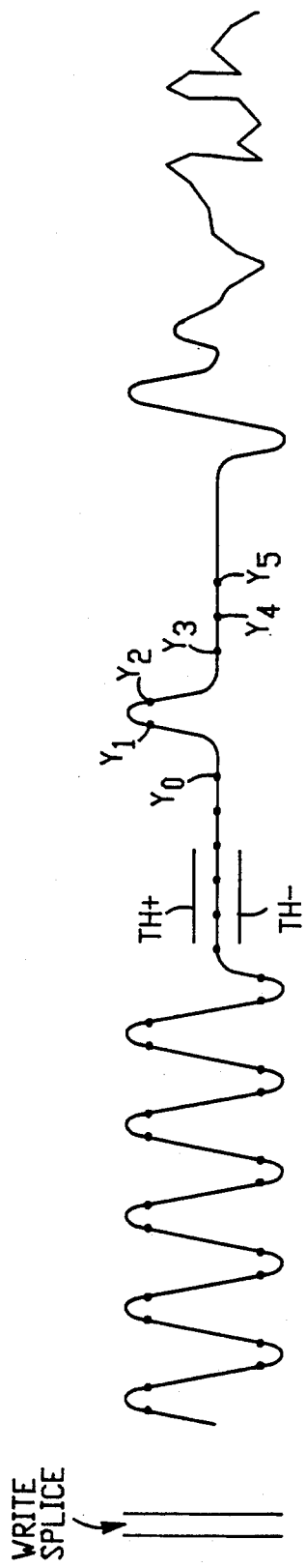
FIG. 17A is a waveform graph of an analog data stream including a sync pattern in accordance with aspects of the present invention.
Figure 17B:
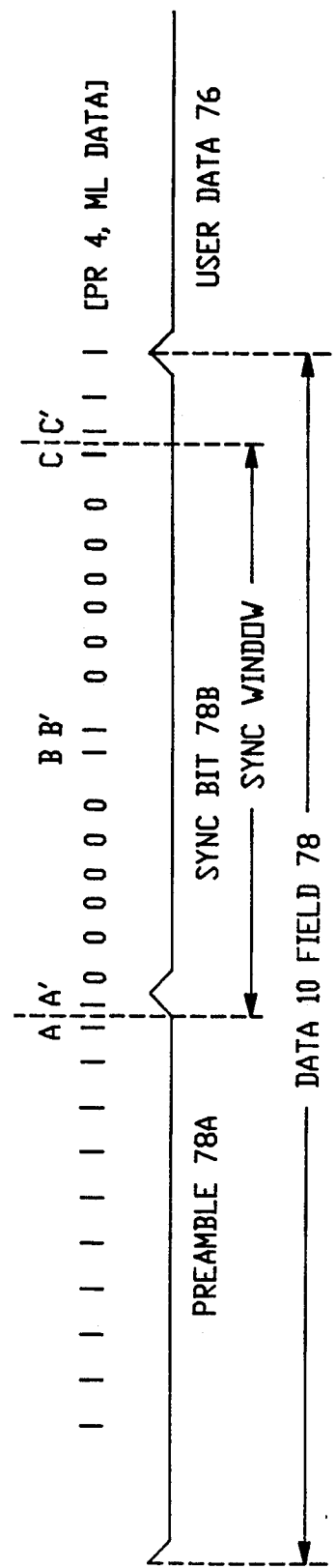
FIG. 17B is an idealized data quantization obtained from the FIG. 17A analog signal pattern.

The sync field pattern has to be selected such that it increases the probability of being successfully decoded while at the same time it decreases the probability of false detection. As graphed in FIG. 17A, one exemplary sync field pattern includes a first flux transition A-A' at the end of the preamble 78A, an intermediate flux transition B-B' nominally located 7 T cells beyond the first transition A-A', and a third transition C-C' nominally located 7 T cells beyond the intermediate flux transition B-B'. FIG. 17A graphs the nominal analog waveform reproduced from the sync field pattern 78B, while FIG. 17B graphs the idealized sampled quantization values resulting from synchronous quantization by the A/D converter 46.

In order to provide for proper detection of the sync pattern and for proper timing of the byte clock, fault tolerance due to single bit shift conditions is provided. Fault tolerant bit detection patterns are tabulated in the FIG. 18 table. Therein, line 1 represents no error. Line 2 represents a delay bit shift of the intermediate transition B-B' one T cell to the right. Line 3 represents an advance bit shift of the intermediate transition B-B' one T cell to the left. Line 4 represents a delay bit shift of the first transition A-A' one T cell to the right. Line 5 represents an advance bit shift of the third transition C-C' one T cell to the left. Line 6 represents a delay bit shift of the first transition A-A' one T cell to the right, and an advance bit shift of the third transition C-C' one T cell to the left. Line 7 represents a fault condition wherein the second intermediate transition sample B' is missing. Line 8 represents a fault condition wherein the first intermediate transition sample B is missing. Line 9 represents a fault condition wherein the second first transition sample A' is missing. Line 10 represents a fault condition wherein the first third transition sample C is missing. Line 11 represents a double fault condition wherein the second first transition sample A' and the first intermediate transition sample B are missing. Line 12 represents a double fault condition wherein the second first transition sample A' and the first third transition sample C are both missing. Line 13 represents a double fault condition wherein the second intermediate sample B' and the first third transition sample C are both missing. In each of these examples, the sync pattern detection circuit 642, illustrated in FIG. 19 and discussed hereinafter is effective in detecting the presence of the sync bit and properly restarting the byte clock to coincide with the immediately following user data field 76.

With reference again to FIG. 16, during sync mode, the comparators 598 and 600 respectively receive and compare d1 with d3, and d3 with d5. This comparison effectively creates an odd/even interleave detection arrangement which is needed for proper sync pattern detection within a synchronized PR4 channel. With reference to FIG. 15, it is apparent that samples $y_{k-1}$ and $y_{k-2}$ on the sync transition will be at the same amplitude in the nominal case. Assume that $y_{k-2}$ corresponds to d3, $y_k$ corresponds to d1, and $y_{k-4}$ corresponds to d5. In this instance, the first condition logic circuit 606 will detect and put out a true or logical one condition on the path 608.

At the same time, positive and negative threshold values THP for the sync pattern are respectively provided through multiplexers 616 and 620, and multiplexer 614 to the comparison input of the comparator 612. The comparator 612, in the sync mode, looks at the magnitude of the d3 sample on the path 611 in relation to the positive or negative threshold value as appropriate, and the comparator 612 thus determines if the d3 sample is above the threshold, thereby removing noise and other extraneous samples otherwise passing the criteria established by the first condition logic circuit 606. In the example given in FIG. 17A wherein $y_{k-2}$ equals d3, the absolute value of the $y_{k-2}$ sample will be above the sync threshold value THP, and condition two will be satisfied as indicated by a logical high or one output on the path 608. The AND gate 626 thus puts out a raw "one" to a latch 634. The delay 634 synchronizes the data with the ADCLK and puts out the result on a path 636 to the sync pattern detector circuit 642, shown in FIG. 19.

Figure 19:
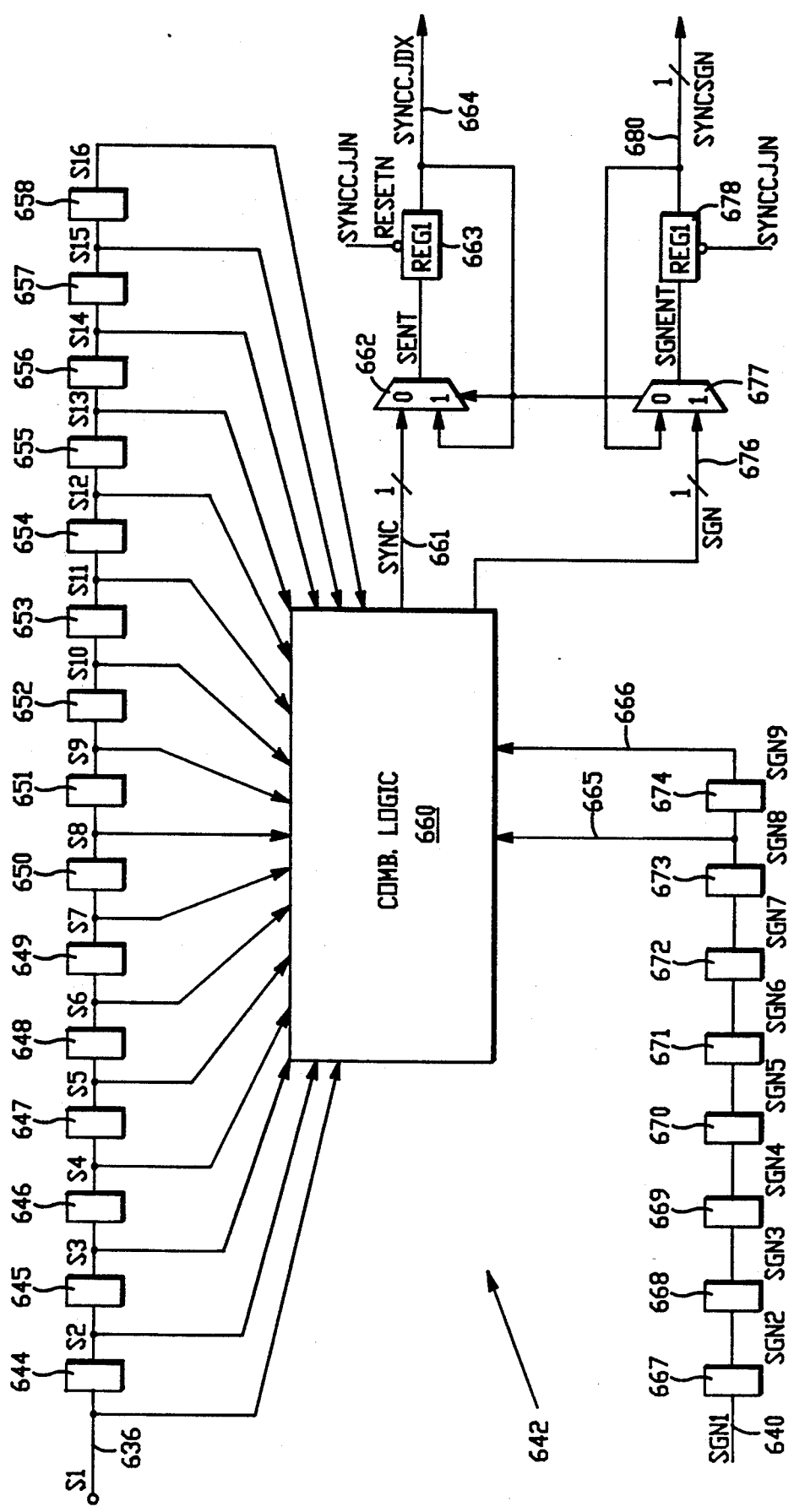
FIG. 19 is a detailed block diagram of logic circuitry implementing the FIG. 18 fault tolerance detection patterns for the FIG. 17 sync pattern.

Turning now to FIG. 19, the detected raw data pattern on the path 636 is fed into the sync pattern detector circuit 642 on a path comprising a string, e.g. 15 tandem connected flip-flop latches 644, 645, 646, 647, 648, 649, 650, 651, 652, 653, 654, 655, 656, 657, and 658 which are clocked at the system ADCLK rate. The incoming line 636 and lines from the outputs of each of the latches feed into a combinatorial logic array 660. The combinatorial array tests for the presence of any of the 16 bit fault tolerant patterns tabulated in FIG. 17A. If any one of those 16 bit data patterns is determined to be present at a particular clock cycle, a sync pattern found signal is put out on a path 661 through a multiplexer 662 and a delay register 663 which latches true. The output 664 is fed back to control the multiplexer 662 to latch the sync bit found value for the remainder of the immediately following data field 76. At the end of the data field, as timed by e.g. by a timer in the digital IC 17, a SYNCOFFN signal is applied to reset the register 663, and the sync pattern found control signal on the path 664 returns to an off state.

The logic array 660 receives two sign bits on paths 665 and 666. One or the other of the sign bits is selected and used, depending upon the particular sync field pattern (and its tolerated bit shift faults) which is actually stored in the logic array 660. The sign bit is provided on a path 640 from the digital peak detector 574 of FIG. 42, and it passes through seven clock period delays 667, 668, 669, 670, 671, 672, and 673 before reaching the first sign bit line 665. An eighth clock period delay 674 is interposed between the sign bit paths 665 and 666. Also, the logic array 660 provides a sync sign bit output on a path 676. The sign bit is passed through a multiplexer 677 and a register 678 to provide an output on a path 680. The output state on the path 680 is fed back to the multiplexer 677. The multiplexer 677 is controlled by the output state of the sync pattern detection path 664. The register 678 is also reset by the SYNCOFFN signal.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A digital peak detection circuit for asynchronous detection of embedded overhead information within a partial response, maximum likelihood synchronous data detection channel of a magnetic disk drive, the channel including an analog to digital converter means, being clocked by a data clock operating asynchronously with respect to playback of said embedded overhead information in said channel and for converting an analog data stream into raw data samples, and an adaptive digital FIR filter means for conditioning the raw data samples into conditioned data samples in accordance with programmable filter coefficients, the digital peak detection circuit including:

means for programming the digital FIR filter means to a bandwidth characteristic selected for said embedded overhead information, a plurality of clock delay means connected in tandem to receive and progressively by a period related to said data clock to delay conditioned data samples of said embedded overhead information, and having taps therebetween, first comparison logic means connected to predetermined ones of the taps of said plurality of data clock period delay means for comparing said conditioned data samples of said embedded overhead information at said predetermined ones of the taps and for generating a first logical condition therefrom, second comparison logic means connected to a predetermined tap of said plurality of clock delay means and to a threshold-providing circuit means, for comparing said conditioned data samples of said embedded overhead information at said predetermined tap with threshold values provided by said threshold-providing circuit means and for generating a second logical condition therefrom, digital combining means for combining the first logical condition and the second logical condition so as to detect and put out said embedded overhead information.

2. The digital peak detection circuit set forth in claim 1 wherein the data detection channel further comprises programmable analog filter/equalizer means in an analog signal path including said analog to digital converter means, and means for programming said analog filter/equalizer means to a bandwidth characteristic selected for said embedded overhead information.

3. The digital peak detection circuit set forth in claim 1 wherein said plurality of tapped clock delay means comprises three single clock period delay circuits connected in tandem, wherein said predetermined ones of the taps provide $y_k$, $y_{k-1}$ and $y_{k-2}$ data samples, and wherein said embedded overhead information comprises embedded servo information.

4. The digital peak detection circuit set forth in claim 3 wherein said first comparison logic means determines said first logical condition as a probable flux transition (logical one value) being present if one of the following is true: $y_{k-1} \geq y_k$ and $y_{k-1} > y_{k-2}$, or $y_{k-1} \leq y_k$ and $y_{k-1} < y_{k-2}$; and otherwise no flux transition (a logical zero value) being present.

5. The digital peak detection circuit set forth in claim 3 wherein said second comparison logic means is connected to a predetermined tap providing a $y_{k-1}$ data sample and determines said second logical condition as a probable flux transition (a logical one value) being present if an absolute value of the $y_{k-1}$ data sample is greater than or equal to a said threshold value, and otherwise no flux transition (a logical zero value) being present.

6. The digital peak detection circuit set forth in claim 3 wherein said first comparison logic means determines said first logical condition as a probable flux transition (logical one value) being present if one of $y_{k-1} > /= y_k$ and $y_{k-1} > y_{k-2}$, or $y_{k-1} </= y_k$ and $y_{k-1} < y_{k-2}$ is true, and otherwise determines no flux transition (a logical zero value) being present; wherein said second comparison logic means is connected to a predetermined tap providing a $y_{k-1}$ data sample and determines said second logical condition as a probable flux transition (logical one value) being present if an absolute value of the $y_{k-1}$ data sample is greater than or equal to a said threshold value, and otherwise no flux transition (a logical zero value) being present; and, wherein said digital combining means comprises an AND gate means for ANDing said first logical condition and said second logical condition.

7. The digital peak detection circuit set forth in claim 1 wherein said plurality of tapped clock delay means comprises five single clock period delay circuits connected in tandem, wherein said predetermined ones of the taps provide $y_k$, $y_{k-2}$ and $y_{k-4}$ data samples, and wherein said embedded overhead information comprises user data field sync pattern information in the form of a single magnetic flux transition signal located substantially in the middle of a predetermined interval of non-transition of a write-current input waveform.

8. The digital peak detection circuit set forth in claim 7, wherein said first comparison logic means determines said first logical condition as a probable flux transition (a logical one value) being present if one of the following is true: $y_{k-2} \geq y_k$ and $y_{k-2} > y_{k-4}$ or $y_{k-2} \leq y_k$ and $y_{k-2} < y_{k-4}$.

9. The digital peak detection circuit set forth in claim 8 wherein said second comparison logic means is connected to a predetermined tap providing a $y_{k-2}$ data sample and determines said second logical condition as a probable flux transition (a logical one value) being present if an absolute value of the $y_{k-2}$ data sample is greater than or equal to a said threshold value, and otherwise no flux transition (a logical zero value) being present.

10. The digital peak detection circuit set forth in claim 8 further comprising data field sync pattern detection means connected to receive and detect said user data field sync pattern information.

11. The digital peak detection circuit set forth in claim 10 wherein said data field sync pattern detection means comprises a series of clock delay means connected in tandem to receive and to delay progressively by a period related to said data clock data samples comprising data field sync pattern and having delay taps between adjacent clock delay means of the series, and logic means connected to the delay taps for detecting a predetermined sequence of said data samples comprising a valid user data field sync pattern information.

12. The digital peak detection circuit set forth in claim 11 wherein said data field sync pattern detection means is fault-tolerant within plus or minus one clock period in detecting as valid said user data field sync pattern information.

13. The digital peak detection circuit set forth in claim 12 further comprising fault tolerant sign bit detection means for detecting and associating a sign bit for a said data field sync pattern within plus or minus one clock period.

14. The digital peak detection circuit set forth in claim 10 further comprising sign bit detection means for detecting a sign bit for said user data field sync pattern information.

15. The digital peak detection circuit set forth in claim 7, wherein said first comparison logic means determines said first logical condition as a probable flux transition (a logical one value) being present if one of $y_{k-2} >/= y_k$ and $y_{k-2} < y_{k-4}$, or $yk-2 </= yk$ and $yk-2 < yk-4$ is true, and otherwise determines no flux transition (a logical zero value) being present; wherein said second comparison logic means is connected to a predetermined tap providing a $y_{k-2}$ data sample and determines said second logical condition as a probable flux transition (a logical one value) being present if an absolute value of the $y_{k-2}$ data sample is greater than or equal to a said threshold value, and otherwise no flux transition (a logical zero value) being present; and, wherein said digital combining means comprises an AND gate means for ANDing said first logical condition and said second logical condition.

16. The digital peak detection circuit set forth in claim 7 wherein said embedded overhead information further comprises embedded servo information, wherein said predetermined taps further provide $y_{k-1}$ and $y_{k-3}$ data samples, and further comprising selection circuitry responsive to a servo field/sync field control signal for selecting between $y_k$, $y_{k-2}$ and $y_{k-4}$ for sync detection. and $y_k$, $y_{k-2}$ and $y_{k-4}$ for sync detection.

17. A method for asynchronous digital peak detection of embedded overhead information within a partial response, maximum likelihood synchronous data detection channel of a magnetic disk drive, the channel including an analog to digital converter means clocked by a data clock operating asynchronously with respect to playback of said embedded overhead information in said channel, for converting an analog data stream into raw data samples, and an adaptive digital FIR filter means for conditioning the raw data samples into conditioned data samples in accordance with programmable filter coefficients, the digital peak detection method including the steps of:

programming the digital FIR filter means to a bandwidth characteristic selected for said embedded overhead information, delaying by a period related to said data clock conditioned data samples of said embedded overhead information with a plurality of clock delay means connected in tandem and having taps therebetween, comparing said conditioned data samples at predetermined ones of the taps and generating a first logical condition based upon said comparison, comparing a conditioned data sample of said embedded overhead information taken at a predetermined tap with a threshold value provided by a threshold-providing circuit and generating a second logical condition therefrom, and combining the first logical condition and the second logical condition to detect and put out said embedded overhead information.

* * * * *